US 12,110,114 B2

(12) United States Patent
Riedel et al.

(10) Patent No.: US 12,110,114 B2
(45) Date of Patent: Oct. 8, 2024

(54) AIRCRAFT SEAT FASTENING DEVICE

(71) Applicant: RECARO Aircraft Seating GmbH & Co. KG, Schwäbisch Hall (DE)

(72) Inventors: Dirk Riedel, Braunsbach (DE); Florian Strobl, Rauhenebrach (DE); Alexander Rechlin, Schwäbisch Hall (DE); Stefan Rössler, Rosengarten (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 722 days.

(21) Appl. No.: 17/268,258

(22) PCT Filed: Aug. 15, 2019

(86) PCT No.: PCT/EP2019/071963
§ 371 (c)(1),
(2) Date: Feb. 12, 2021

(87) PCT Pub. No.: WO2020/035571
PCT Pub. Date: Feb. 20, 2020

(65) Prior Publication Data
US 2021/0188444 A1  Jun. 24, 2021

(30) Foreign Application Priority Data
Aug. 15, 2018 (DE) .......................... 102018119846.9

(51) Int. Cl.
*B64D 11/06* (2006.01)

(52) U.S. Cl.
CPC ...... *B64D 11/0648* (2014.12); *B64D 11/0619* (2014.12); *B64D 11/064* (2014.12); *B64D 11/0696* (2013.01)

(58) Field of Classification Search
CPC ................. B64D 11/0648; B64D 11/0696
See application file for complete search history.

(56) References Cited

U.S. PATENT DOCUMENTS

| | | | |
|---|---|---|---|
| 5,730,492 A * | 3/1998 | Warrick | B64D 25/04 297/216.2 |
| 8,226,163 B1 | 7/2012 | Pearson et al. | |
| 9,663,232 B1 | 5/2017 | Porter et al. | |
| 2003/0078145 A1 | 4/2003 | Winkler | |
| 2005/0109877 A1 | 5/2005 | Williamson et al. | |
| 2006/0263164 A1 | 11/2006 | Dowty et al. | |

(Continued)

FOREIGN PATENT DOCUMENTS

| | | |
|---|---|---|
| DE | 102012001576 A1 | 8/2013 |
| DE | 102013219616 A1 | 4/2015 |

(Continued)

OTHER PUBLICATIONS

German Search Report dated Jul. 26, 2019, issued in corresponding German Patent Application No. 102018119846.9 (and English Machine Translation).

(Continued)

*Primary Examiner* — Nicholas McFall
(74) *Attorney, Agent, or Firm* — Posz Law Group, PLC

(57) ABSTRACT

An aircraft seat fixation device for a fixation at least of a portion of an aircraft seat on at least one fixation rail that is fixated on an aircraft structure comprises a seat base structure which is configured such that at least the aircraft seat is mounted thereon at least partially, further comprises at least one seat foot which is connected to the seat base structure, and comprises at least one fitting element which is connected to the seat foot and is at least configured to be coupled with the fixation rail,
wherein the aircraft seat fixation device comprises at least one compensation unit, which is arranged on the seat base structure, the seat foot and/or the fitting element and which is configured to permit at least one compensation movement of the seat base structure at least in an overload case.

18 Claims, 8 Drawing Sheets

(56) References Cited

U.S. PATENT DOCUMENTS

Figure 1:
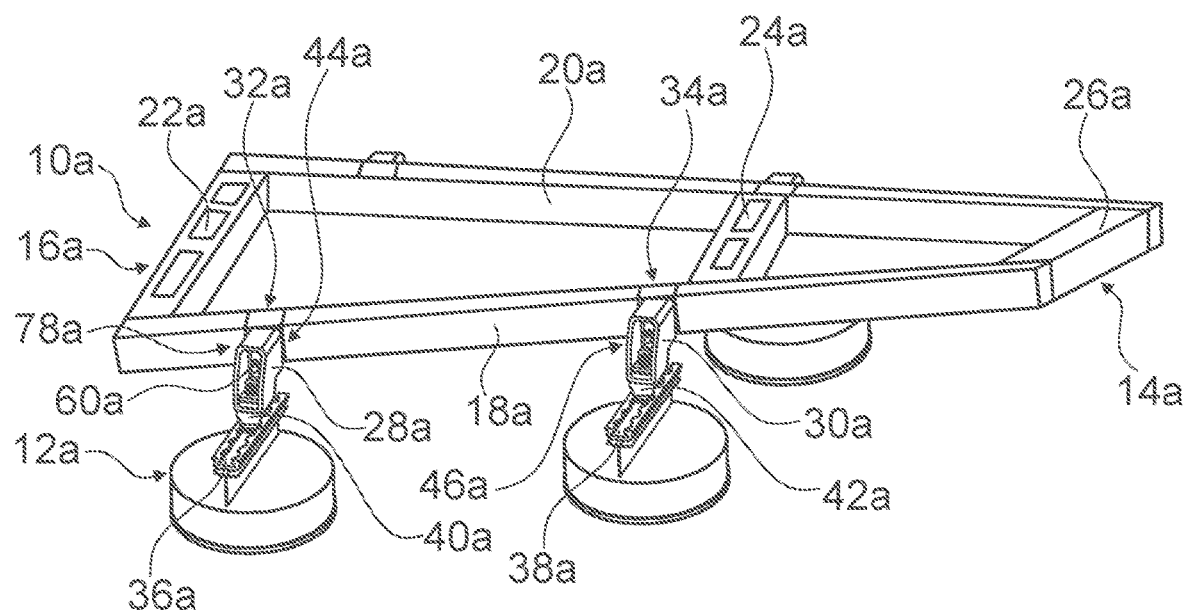

| | | |
|---|---|---|
| 2011/0079681 A1 | 4/2011 | Honnorat |
| 2011/0278887 A1 | 11/2011 | Trimble et al. |
| 2014/0042273 A1 | 2/2014 | Day et al. |
| 2014/0191081 A1 | 7/2014 | Ward et al. |
| 2015/0035340 A1 | 2/2015 | Lussan |
| 2016/0107542 A1 | 4/2016 | Trimble et al. |
| 2016/0214719 A1 | 7/2016 | Thomaschewski |
| 2016/0340045 A1 | 11/2016 | Roderwald et al. |
| 2017/0246972 A1 | 8/2017 | Wegenka et al. |
| 2017/0253337 A1 | 9/2017 | Crozat et al. |
| 2017/0274999 A1 | 9/2017 | Alamgir et al. |
| 2017/0275003 A1 | 9/2017 | Erhel et al. |
| 2018/0044025 A1 | 2/2018 | Brodish |
| 2018/0327097 A1 | 11/2018 | Loose et al. |

FOREIGN PATENT DOCUMENTS

| | | |
|---|---|---|
| DE | 102014104915 A1 | 10/2015 |
| DE | 102015222233 A1 | 5/2017 |
| EP | 2695813 A2 | 2/2014 |
| GB | 2569303 A | 6/2019 |
| WO | 2016/142671 A1 | 9/2016 |

OTHER PUBLICATIONS

Gleichner et al., "Component Maintenance Manual with Illustrated Parts List", Fischer+Entwicklungen, Sep. 29, 2015; 120 pages; Attendant Seat NG, Part No. 1021-()-B-(); Landshut, Germany.

International Search Report dated Sep. 26, 2019, issued in corresponding International Patent Application No. PCT/EP2019/071963.

International Preliminary Amendment Report on Patentability dated Feb. 16, 2021, issued in corresponding International Patent Application No. PCT/EP2019/071963.

European Office Action dated Sep. 1, 2022 issued in corresponding EP Patent Application No. 19755607.9 (and English translation).

Office Action mailed Sep. 27, 2023 in corresponding European Patent Application No. 19 755 607.9 (and English translation).

\* cited by examiner

AIRCRAFT SEAT FASTENING DEVICE

CROSS REFERENCE TO RELATED APPLICATIONS

This application is a U.S. national stage application of PCT/EP2019/071963 filed on Aug. 15, 2019, which is based on German Patent Application No. 10 2018 119 846.9 filed on Aug. 15, 2018, the contents of which are incorporated herein by reference.

State of the Art

The invention concerns an aircraft seat fixation device according to the preamble of patent claim 1.

An aircraft seat fixation device for a fixation at least of a portion of an aircraft seat on at least one fixation rail that is fixated on an aircraft structure, with a seat base structure which is configured such that at least the aircraft seat is mounted thereon at least partially, with at least one seat foot which is connected to the seat base structure, and with at least one fitting element which is connected to the seat foot and is at least configured to be coupled with the fixation rail, has already been proposed.

The objective of the invention is in particular to provide a generic device with improved characteristics regarding safety, in particular by a reduction of loads in a fixation rail. The objective is achieved according to the invention by the features of patent claim 1 while advantageous implementations and further developments may be gathered from the subclaims.

Advantages of the Invention

The invention is based on an aircraft seat fixation device for a fixation at least of a portion of an aircraft seat on at least one fixation rail that is fixated on an aircraft structure, with a seat base structure which is configured such that at least the aircraft seat is mounted thereon at least partially, with at least one seat foot which is connected to the seat base structure, and with at least one fitting element which is connected to the seat foot and is at least configured to be coupled with the fixation rail.

It is proposed that the aircraft seat fixation device comprises at least one compensation unit, which is arranged on the seat base structure, the seat foot and/or the fitting element and which is configured to permit at least one compensation movement of the seat base structure at least in an overload case. By an "aircraft seat fixation device" is in particular a device to be understood which is configured to at least partly fixate an aircraft seat and/or an aircraft seat arrangement on a mounting plane. By an "aircraft seat" is here in particular a seat to be understood which is configured to be mounted on a cabin floor in an aircraft cabin of an aircraft, and which a passenger can sit on during a flight. The aircraft seat may herein be a single seat, e. g. a business-class or first-class aircraft seat, comprising parts of an aircraft seat arrangement, like for example a console or an ottoman. The aircraft seat may also be an aircraft seat that is part of an aircraft seat row consisting of several aircraft seats, which may here in particular be an economy class aircraft seat. An "aircraft structure" is in particular to mean a load-bearing structure of an aircraft, via which an aircraft seat or an aircraft seat module can be fixedly coupled for a use in the aircraft seat. The aircraft structure is herein preferably embodied as a cabin floor of an aircraft cabin. By a "fixation rail" is in particular a rail to be understood which preferably forms a hollow profile that is configured for a form-fit connection with an element, in particular at least a holding region of a fitting element. The fixation rail is in a mounted state connected with a cabin floor of an aircraft and is preferably inserted in the cabin floor of the aircraft. The fixation rail has on its upper side a guiding opening, which at least a portion of the fitting element is guided through in a mounted state. The fixation rail comprises, in at least substantially equal distances, mounting regions, in which the guiding opening respectively has a wider cross section. In the mounting regions the guiding region is realized in a substantially circular fashion. The mounting regions are configured such that a holding region of the fitting element can be inserted into the fixation rail through one of the mounting regions to establish a form-fit connection with the fixation rail. By a "seat base structure" is in particular a load-bearing structure of the aircraft seat or of an aircraft seat arrangement to be understood, via which, for example, forces can be introduced into the aircraft seat structure from a sitting area of the aircraft seat by a passenger sitting on the aircraft seat, or weight forces of the aircraft seat or weight forces of portions of the aircraft seat arrangement can be introduced into the aircraft seat structure. It is herein in particular conceivable that the aircraft seat base is implemented by a base frame having a plurality of interconnected frame elements or is implemented by a receiving plate. Principally it is also conceivable that the seat base structure is realized as a portion of a mounting unit. By a "seat foot" is in particular an element to be understood which has an aircraft-seat-side connection for a fitting element and is in particular configured for a coupling of the aircraft seat with the fixation rail via the fitting element. The seat foot in particular comprises a connection region for a fitting element, via which the fitting element is fixedly connectable with the seat foot. The seat foot is in particular implemented as a structural component of the aircraft seat. In a mounted state the seat foot is fixedly connected with the aircraft seat base structure via a seat foot connection. By a "fitting element" is in particular an element to be understood which is in at least one operation state configured for a fixation of an aircraft seat or an aircraft seat arrangement, in particular on a cabin floor of an aircraft. In particular, the fitting element is in the operation state held in a recess in the floor, in particular in a fixation rail in the floor. Preferentially the fitting element comprises at least one fixation region comprising at least one fixation member. In particular, the fitting element is supported in the fixation rail along a direction that is oriented at least substantially parallel to the floor. "Coupled" is in particular to mean connected to one another directly or indirectly, wherein in case of an indirect connection a component or several components may be arranged between the two indirectly coupled components. By a "compensation unit" is in particular a unit to be understood which is in particular, in at least one operation state, configured to permit a destruction-free relative movement between at least two elements, like in particular a cabin floor and at least a portion of the seat base structure. The relative movement permitted by the compensation unit is here preferably limited to a maximum movement. The relative movement may be realized in particular by a rotation movement, by a linear movement or by a combination of a rotation movement and a linear movement. By a "destruction-free relative movement" is here in particular a relative movement to be understood which can be executed without a mechanical destruction of one of the elements or of the compensation unit. Herein a destruction-free relative movement is preferably reversible when a force that led to the relative movement has abated. An "overload case" is in particular to mean an operation state that differs from normal operation, for example an overload on the aircraft seat device intentionally induced in a crash test. By a "compensation movement" is in particular a destruction-free relative movement of at least two elements to be understood, which can be realized by the compensation unit. "Configured" is in particular to mean specifically designed and/or equipped. By an object being configured for a certain function is in particular to be understood that the object fulfills and/or executes said certain function in at least one application state and/or operation state. An implementation according to the invention allows providing an especially secure and stable aircraft seat fixation device as it is possible that at least a portion of a seat base structure executes a relative movement to an aircraft base structure in an overload case.

It is further proposed that the at least one compensation unit is arranged between the seat base structure and the seat foot. "Arranged between the seat base structure and the seat foot" is in particular to mean that the compensation unit is positioned between the seat base structure and the seat foot in terms of space and/or in particular also in terms of functionality. This allows arranging the compensation unit in an especially advantageous and simple manner.

Moreover it is proposed that the compensation unit is integrated in a seat foot connection, via which the at least one seat foot is connected to the seat base structure. A "seat foot connection" is in particular to mean a connection implemented of an element or a plurality of elements, in particular fixation element/s, via which a seat foot is, preferably in a force-fit and/or form-fit manner, connected with a seat base structure. This enables the compensation unit to be integrated in the aircraft seat fixation device in an especially simple and advantageous manner.

It is also proposed that the compensation unit is configured, at least in an overload case, to permit at least a rotation of the seat foot around a rotation axis relative to the seat base structure. In this way it is possible for an especially advantageous compensation movement to be permitted.

Beyond this it is proposed that the compensation unit is configured to permit a rotation by at least one degree. By a "rotation by at least one degree" is in particular to be understood that a possible rotation permitted by the compensation unit amounts to at least one degree, advantageously more than five degrees and in an especially advantageous implementation more than ten degrees. This allows the compensation unit to be implemented in a particularly advantageous manner.

Furthermore it is proposed that the compensation unit is configured to delimit a rotation to maximally 15 degrees. By a "rotation of maximally 15 degrees" is in particular to be understood that the rotation is delimited by the compensation unit to 15 degrees, preferentially to 13 degrees and in an especially advantageous implementation to maximally 11 degrees. This allows the compensation unit to be implemented in a particularly advantageous manner.

It is also proposed that a compensation movement executed by the compensation unit is at least substantially free of elastic and/or plastic deformation. By "at least substantially free of elastic and/or plastic deformation" is in particular to be understood that the compensation movement is in particular given solely by a relative movement of two elements which are implemented separately from each other, and is not due to an elastic and/or plastic deformation of at least one of the elements. This allows implementing the compensation unit in a particularly advantageous manner.

It is further proposed that the compensation unit comprises at least one central swivel pin, by which the seat foot is coupled with the seat base structure in a positionally fixed manner. This allows the compensation unit to be positioned on the seat base structure in a particularly simple manner.

Moreover it is proposed that the compensation unit comprises at least one connection member, which is arranged eccentrically to the swivel pin and is arranged at least one-sidedly in a through hole. By an "eccentrically arranged connection member" is in particular to be understood that the connection member is arranged spaced apart with respect to the swivel pin that is arranged substantially centrally. "Arranged at least one-sidedly in a through hole" is here in particular to mean that the connection member is guided at least in a through hole formed by the seat base structure and/or in a through hole formed by the seat foot. By a "connection member" is in particular a connection element to be understood which is configured for a connection of at least two other elements and which is preferably, in a connected state, configured to prevent a movement of the at least two interconnected elements in a movement direction. A "connection member" is in particular to mean a bolt, a pin, a rivet or preferably a screw. It is in this way possible for the compensation unit to be implemented in an especially simple manner such as to provide a rotational compensation movement.

Beyond this it is proposed that the compensation unit comprises at least one positioning unit which, at least in a normal operation state, positions the at least one connection member in the through hole in a normal position. By a "positioning unit" is in particular a unit to be understood which holds at least two elements in a desired position relative to each other, preferably during assembly and in a normal operation state. By a "normal operation state" is in particular an operation state to be understood in which only such forces occur which are usual for a flight operation, i. e. in particular by a passenger sitting on the seat and corresponding acceleration forces occurring during flight, start or landing. A "normal position in the curved through hole" is in particular to mean a position of the connection member in the through hole in which the seat foot has a normal position with respect to the seat base module. The normal position is preferentially arranged centrally in the through hole, such that a compensation movement may take place in both rotation directions in the same manner. This advantageously allows ensuring a functionally secure normal operation.

It is further proposed that the positioning unit holds the connection member in the normal position by a preload force in a force-fit manner. This advantageously allows implementing the positioning unit in an especially simple manner.

Moreover it is proposed that the at least one compensation unit is arranged at least partially between the fitting element and the seat foot. Preferentially, by the compensation unit being "arranged at least partially between the fitting element and the seat foot" is in particular to be understood that at least portions of the compensation unit are arranged between the fitting element and the seat foot in terms of functionality and of location. This allows arranging the compensation unit in an especially advantageous manner.

It is also proposed that the at least one compensation unit is at least configured, in an overload case, to permit an increase of a distance between a front fitting element and the seat base structure. Preferably the compensation unit is in particular configured to permit a relative movement between the front fitting element and the seat base structure, in particular the base frame. In this way a deformation of the seat base structure is advantageously avoidable in an overload case, for example in case of a deformation of a cabin floor.

Beyond this it is proposed that the at least one compensation unit comprises at least one fixation sleeve, which is configured to be arranged in the at least one seat foot such that it is axially displaceable, and which at least the one front fitting element is fixedly connected to. By a "fixation sleeve" is in particular a sleeve to be understood in which an element, in particular a fitting element, can be fixedly mounted. This enables the compensation unit to support the fitting element such that it is especially easily displaceable relative to the seat base structure.

It is further proposed that, at least in a normal operation state, the fixation sleeve is held in the seat foot in a normal position by a friction-fit connection. In this way the fixation sleeve is especially easily couplable with the one seat foot.

It is also proposed that the compensation unit comprises at least one additional lower longitudinal beam, on which the base frame is connected in a pivotable manner. By an "additional lower longitudinal beam" is in particular a longitudinal beam to be understood which is in particular arranged below a longitudinal beam of the base frame, in particular below a longitudinal beam that is arranged above a fixation rail. Preferably, for a fixation on a fixation rail, the additional lower longitudinal beam is connected to a rear fitting element on a rear end and is connected to a front fitting element on a front end. Preferentially the base frame is supported movably relative to the additional longitudinal beam, in particular the base frame is pivotable relative to the additional longitudinal beam with a front end. This especially advantageously enables the base frame to be coupled with a cabin floor and to pivot relative to the cabin floor in an overload case.

The aircraft seat fixation device according to the invention is herein not to be limited to the application and implementation described above. In particular, to fulfill a functionality that is described here, the aircraft seat fixation device according to the invention may comprise a number of individual elements, structural components and units that differs from a number mentioned here.

DRAWINGS

Further advantages will become apparent from the following description of the drawings. In the drawings five exemplary embodiments of the invention are illustrated. The drawings, the description and the claims contain a plurality of features in combination. Someone skilled in the art will purposefully also consider the features separately and will find further expedient combinations.

Figure 2:
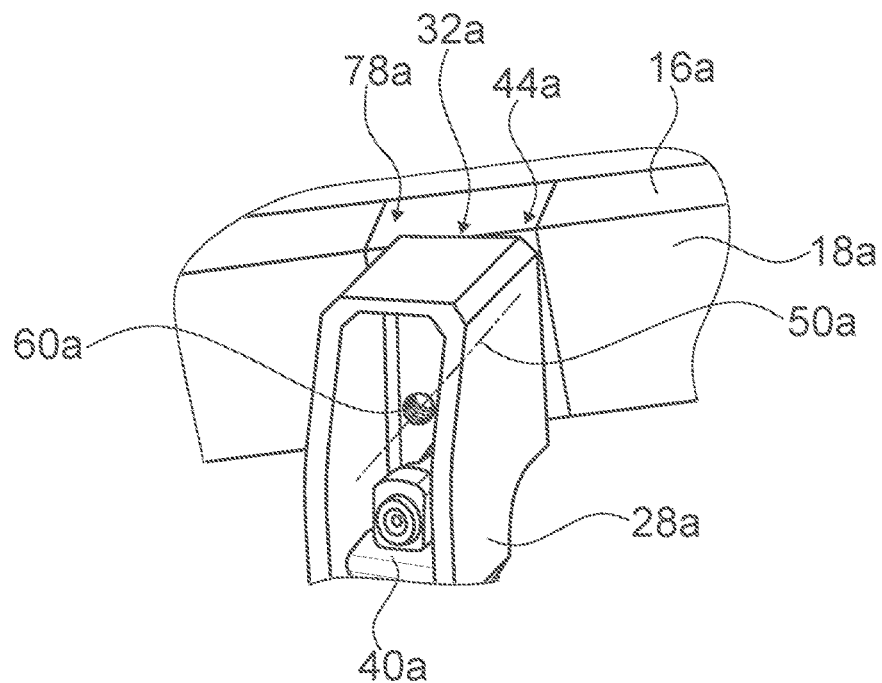
Figure 3:
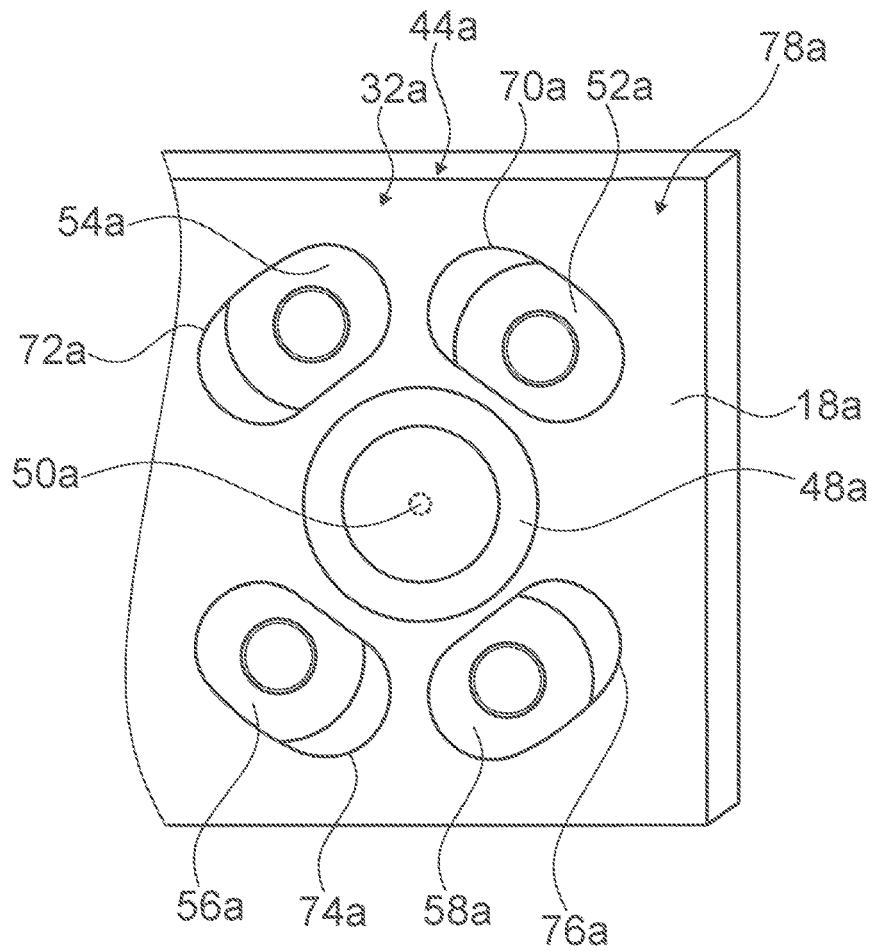
Figure 4:
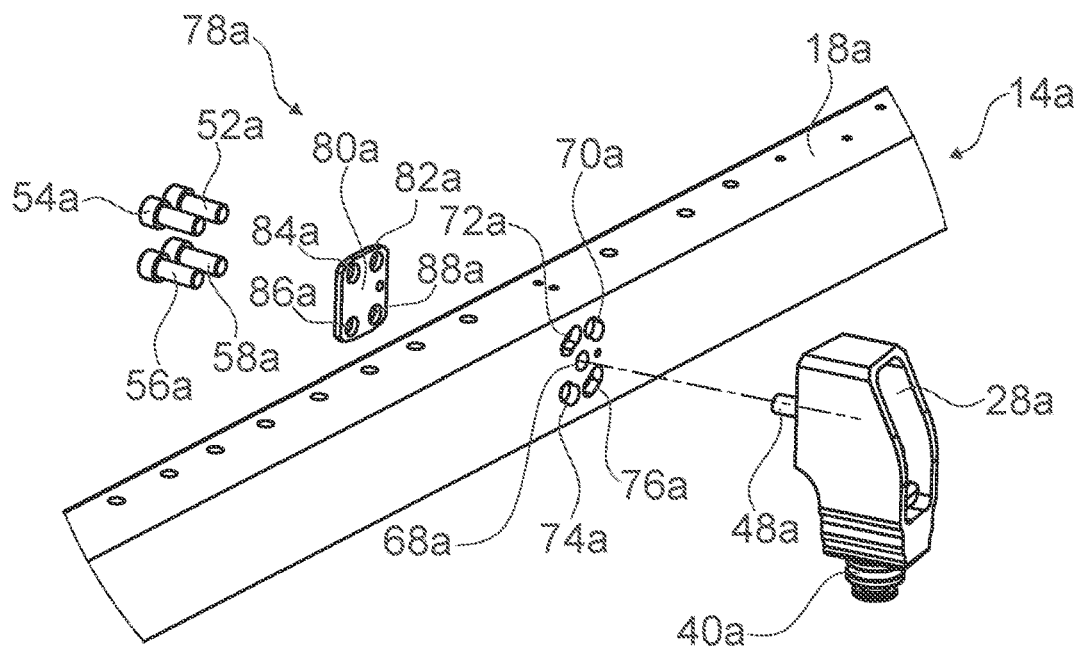
Figure 5:
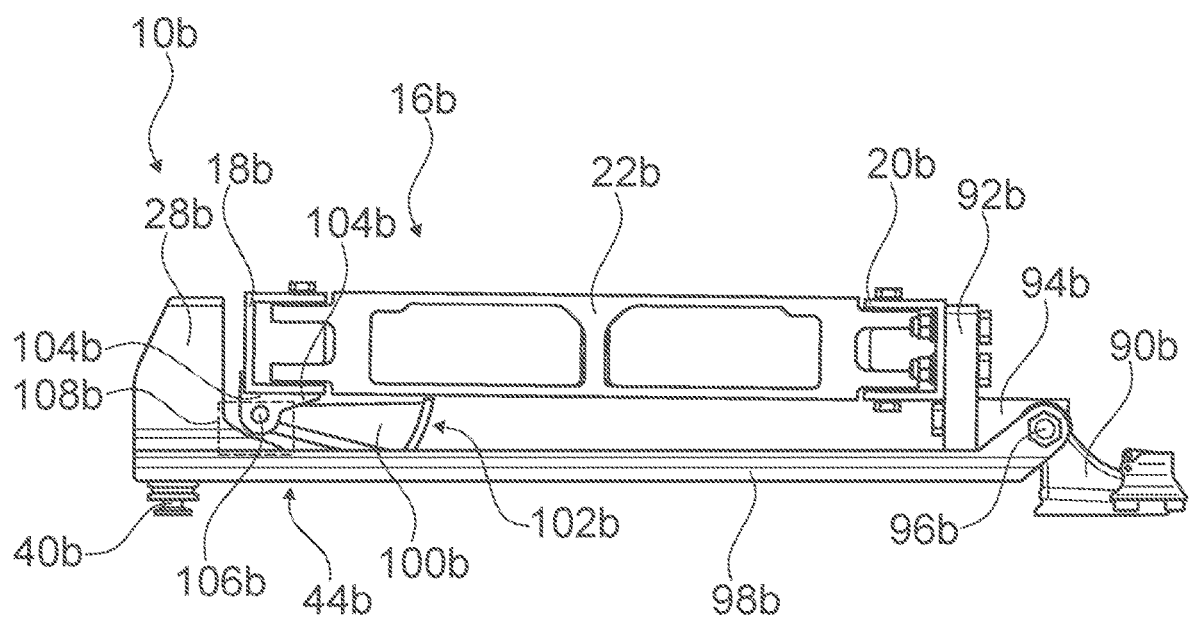
Figure 6:
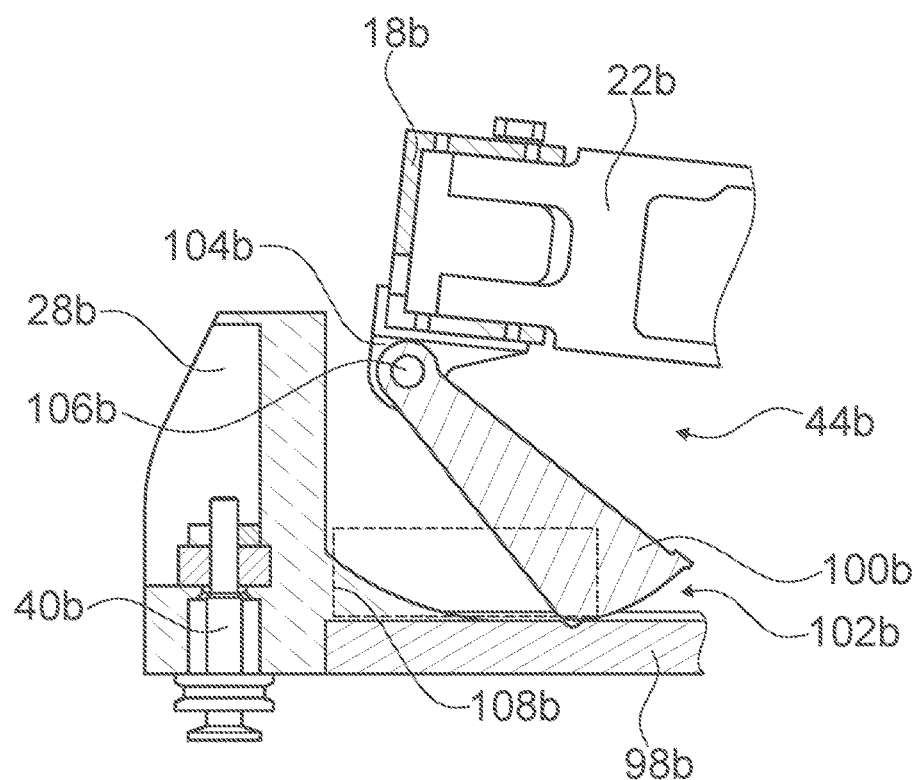
Figure 7:
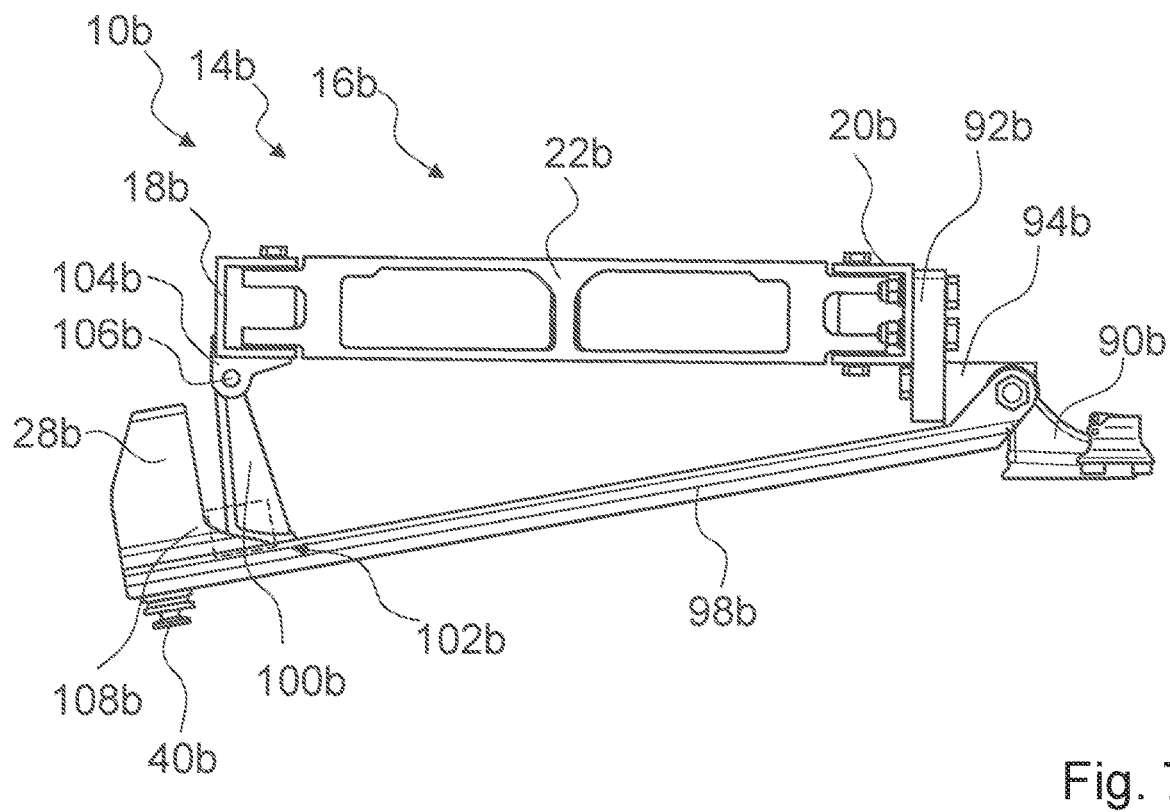
Figure 8:
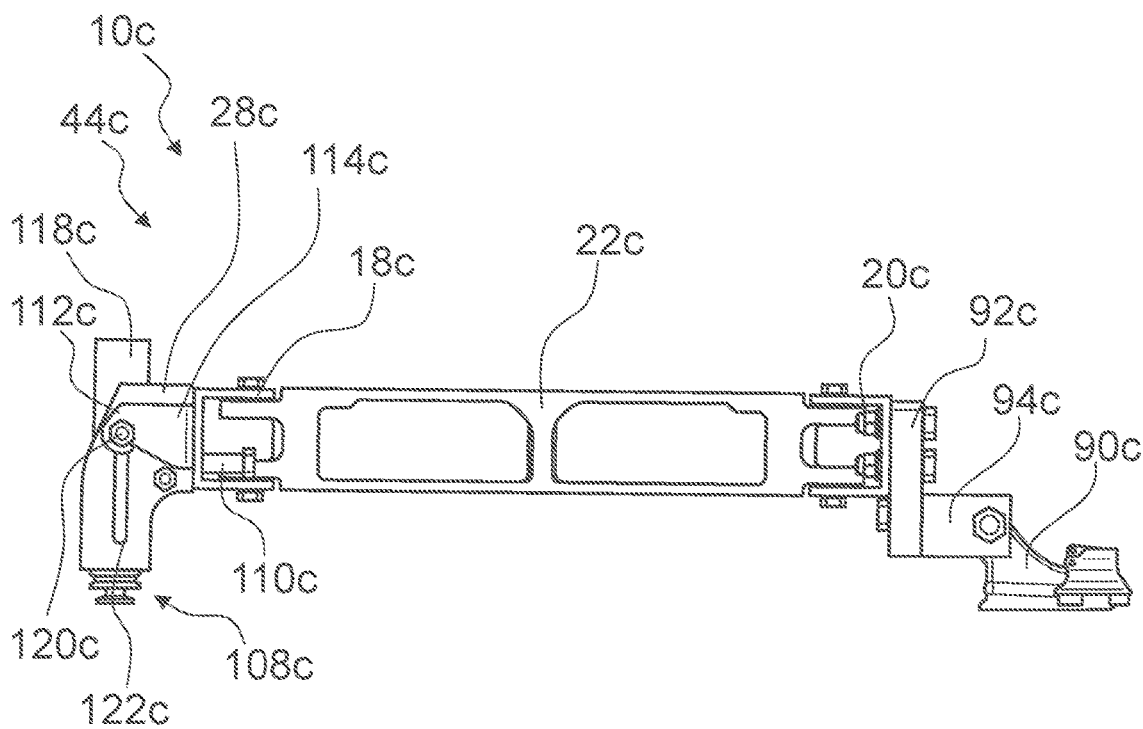
Figure 9:
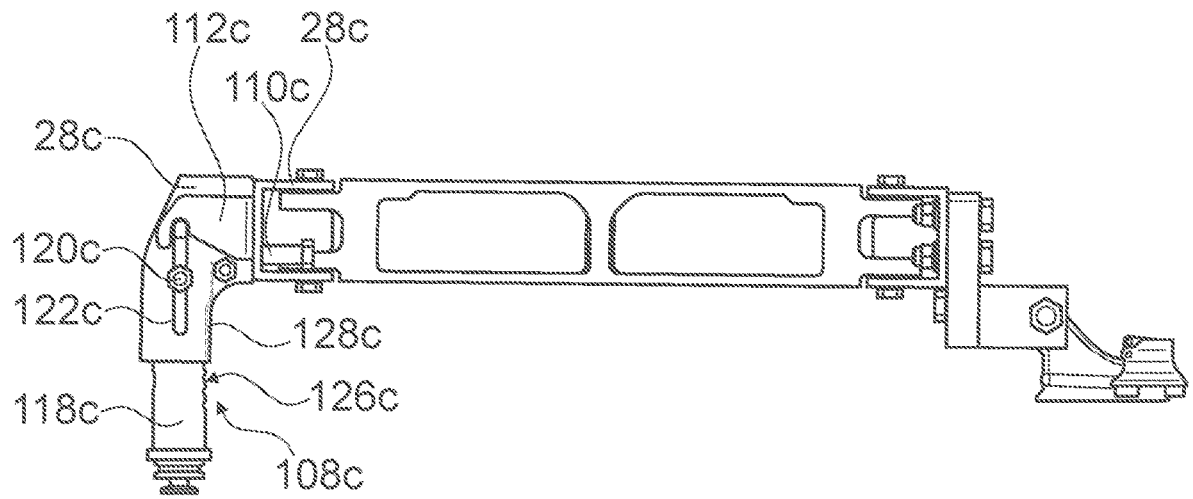
Figure 10:
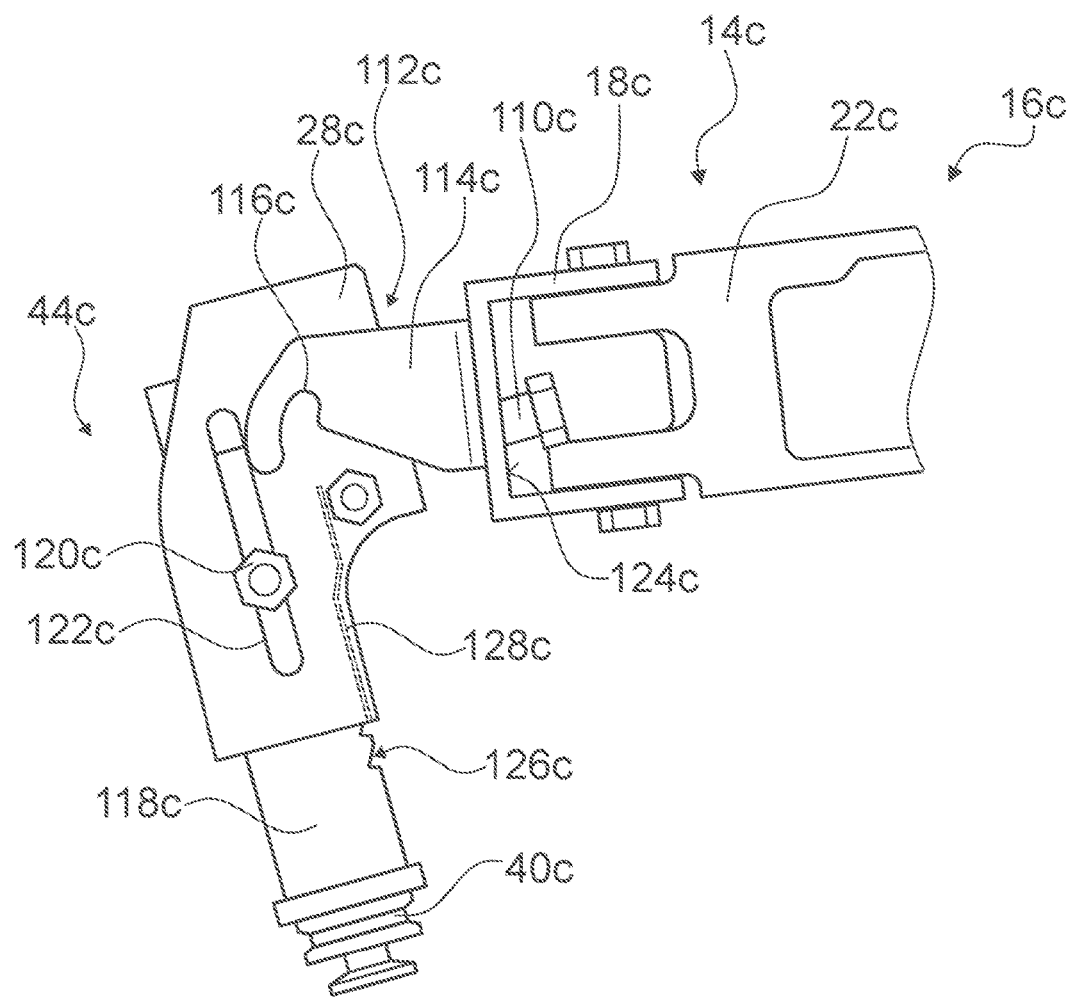
Figure 11:
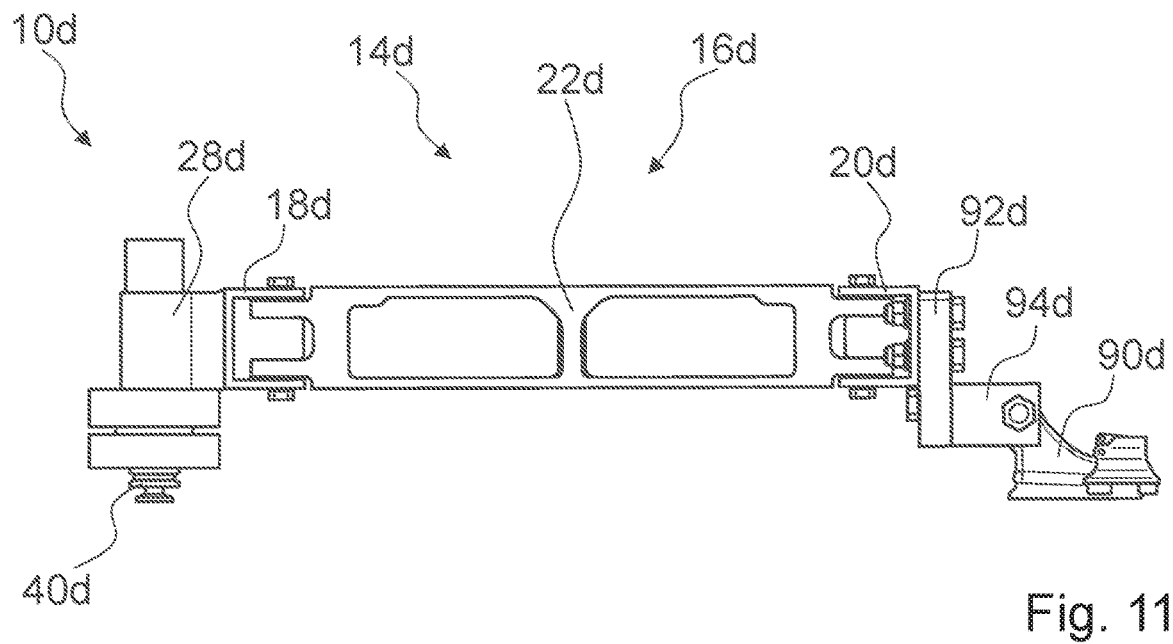
Figure 12:
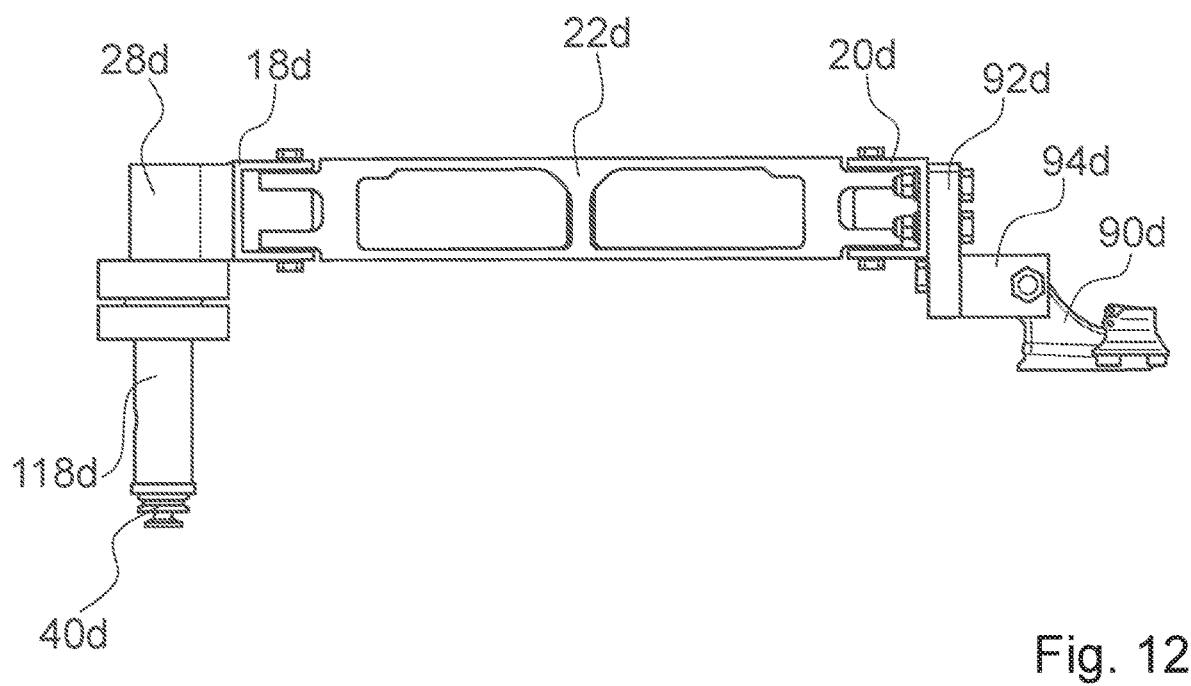
Figure 13:
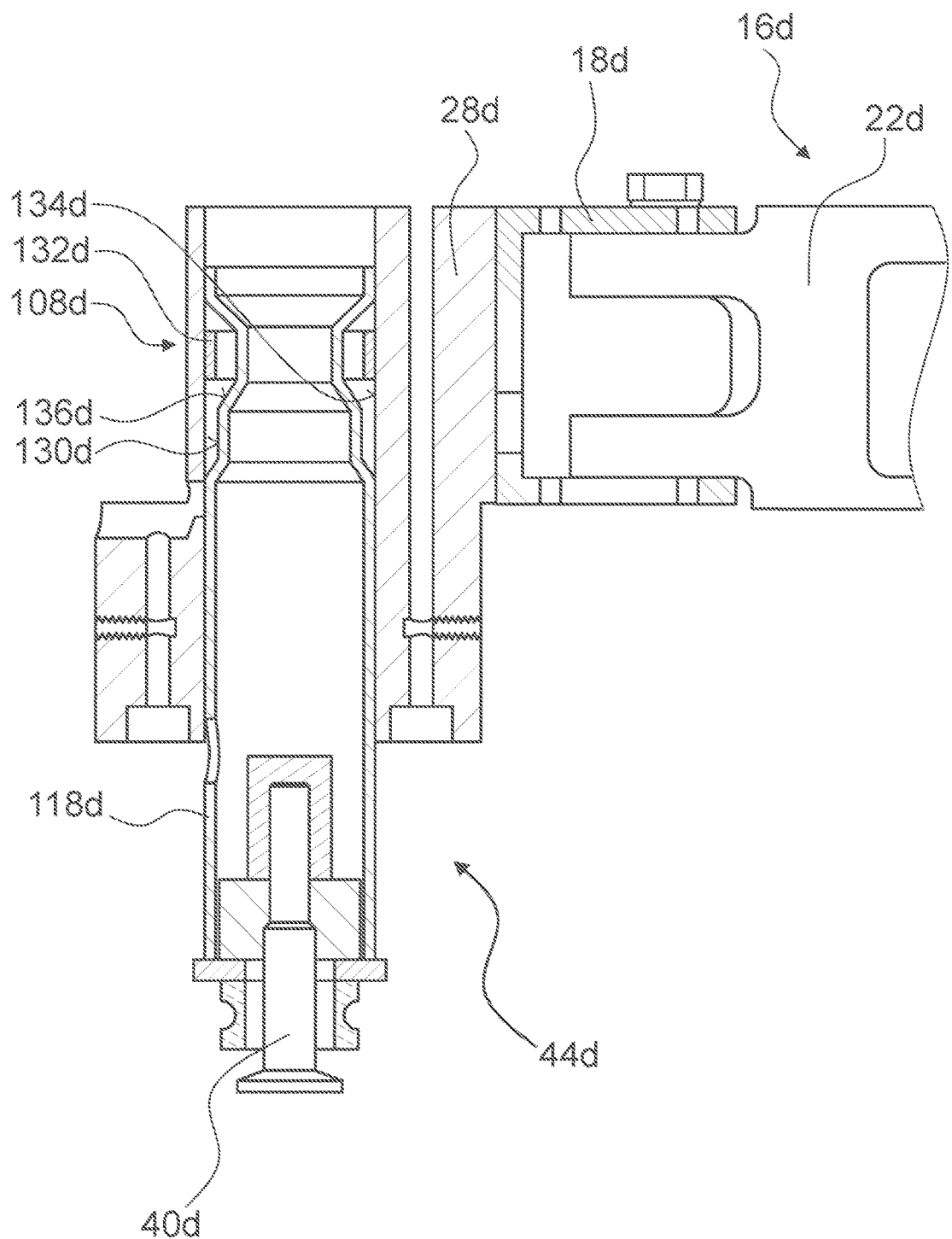
Figure 14:
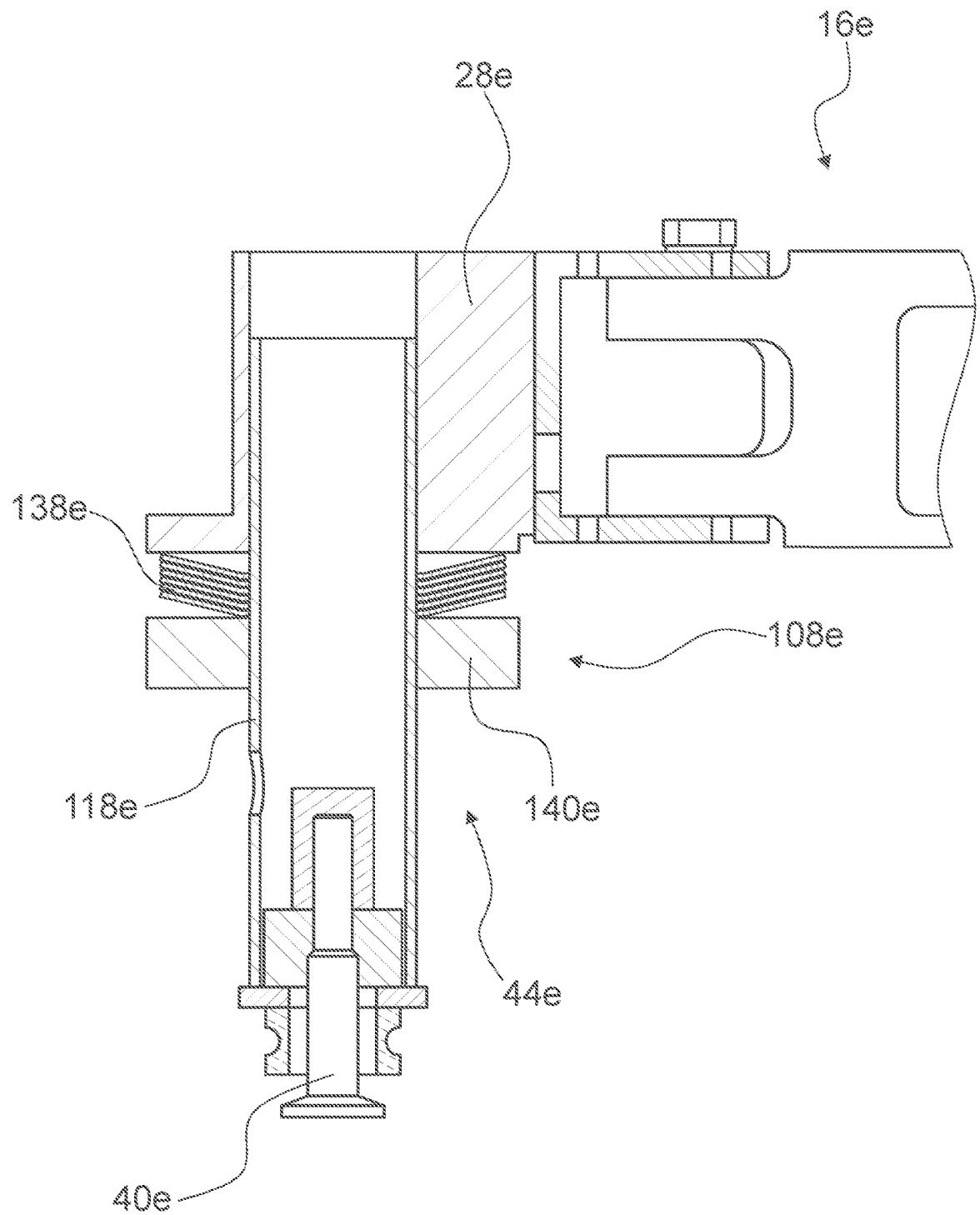

It is shown in:

FIG. 1 a schematic representation of an aircraft seat fixation device in a first exemplary embodiment during an overload case, FIG. 2 a schematic detail representation of a seat foot which is in the overload case rotated relative to a seat base structure by means of a compensation unit, FIG. 3 another detail view of the compensation unit in an overload case, FIG. 4 a schematic exploded view of a portion of the aircraft seat fixation device, FIG. 5 a schematic representation of an aircraft seat fixation device in a second exemplary embodiment during a normal operation state, FIG. 6 a schematic sectional view of the aircraft seat fixation device in an overload case, FIG. 7 another schematic view of the aircraft seat fixation device in an overload case, FIG. 8 a schematic representation of an aircraft seat fixation device in a third exemplary embodiment during a normal operation state, FIG. 9 another representation of the aircraft seat fixation device in an overload case, FIG. 10 a detail representation of the aircraft seat fixation device in an overload case, FIG. 11 a schematic representation of an aircraft seat fixation device in a fourth exemplary embodiment during a normal operation state, FIG. 12 another representation of the aircraft seat fixation device in an overload case, FIG. 13 a detail representation of the aircraft seat fixation device in an overload case, and FIG. 14 a schematic detail representation of an aircraft seat fixation device in a fifth exemplary embodiment during an overload case.

DESCRIPTION OF THE EXEMPLARY EMBODIMENTS

In FIGS. 1 to 3 a first exemplary embodiment of the aircraft seat fixation device according to the invention is illustrated. The aircraft seat fixation device is part of an aircraft seat arrangement 10a. The aircraft seat arrangement 10a comprises an aircraft seat. The aircraft seat is implemented as a business-class or first-class aircraft seat. The aircraft seat arrangement 10a further comprises an aircraft seat superstructure. The aircraft seat superstructure is herein realized as a superstructure forming a housing for the aircraft seat as well as in particular a console with depositing possibilities and, for example, a foot space for a further aircraft seat. Neither the aircraft seat superstructure nor the aircraft seat itself shall be further described here, nor are they depicted in detail in the figures. The aircraft seat and the aircraft seat superstructure are aircraft seats respectively aircraft seat superstructures known from the state of the art. The exact implementation of the aircraft seat, respectively the aircraft seat superstructure, of the aircraft seat arrangement 10a is not relevant for the inventive idea of the aircraft seat fixation device. The aircraft seat arrangement 10a is configured to be installed in an aircraft. The aircraft seat arrangement 10a is in particular configured to be mounted in an aircraft cabin. The aircraft cabin forms an aircraft structure 12a. The aircraft structure 12a is implemented as a cabin floor. For a connection of aircraft seat arrangements 10a the aircraft cabin comprises fixation rails 36a, 38a, which are inserted in the aircraft structure 12a that is implemented as a cabin floor. The fixation rails 36a, 38a extend parallel to each other and are rigidly connected with the aircraft structure 12a.

The aircraft seat fixation device comprises a seat base structure 14a. The seat base structure 14a is in particular part of the aircraft seat arrangement 10a. The seat base structure 14a is configured such that at least the aircraft seat is mounted thereon. The seat base structure 14a is implemented of a base frame 16a. The base frame 16a comprises two transversal beams 18a, 20a and three longitudinal beams 22a, 24a, 26a. The transversal beams 18a, 20a are connected to each other via the longitudinal beams 22a, 24a, 26a. The transversal beams 18a, 20a and the longitudinal beams 22a, 24a, 26a are respectively connected to one another fixedly, preferably in particular rigidly. In particular, the transversal beams 18a, 20a and the longitudinal beams 22a, 24a, 26a are respectively screwed with one another.

Principally it is also conceivable that the transversal beams 18a, 20a and the longitudinal beams 22a, 24a, 26a are respectively connected to one another in a different way, deemed expedient by someone skilled in the art, in a form-fit and/or force-fit manner and/or by substance-to-substance bond, for example via a rivet connection or via a welding connection. Principally it is also conceivable that the base frame 16a is formed on a different number of elements, i. e. in particular a different number of transversal and/or longitudinal beams. The base frame 16a forms a basic structure which the aircraft seat and the aircraft seat superstructure are fixedly mountable on. The base frame 16a realizes a basic structure for the aircraft seat and the aircraft seat superstructure, which is substantially rigid at least in the normal operation. Principally it is possible that, for example in a crash test, in particular in a case in which the cabin floor gets deformed, the base frame 16a gets twisted by the impacting forces in an overload case. Herein, in particular with a base frame known from the state of the art, in particular in the so-called "pitch-and-roll pre-deformation" carried out in tests for approval of aircraft seat arrangements, impacting forces lead to twisting of the base frame 16a, which may in particular result in breaks of the base frame 16a or of the fixation rails 36a, 38a. It is therefore advantageous to keep twisting of the base frame 16a and preferentially of the entire seat base structure 14a at a lowest possible level, even in an overload case, such as to avoid failure of the base frame 16a, in particular due to breaking. The aircraft seat fixation device according to the invention here has in particular the task to keep such twisting of the base frame 16a in an overload case at a lowest possible level, preferably to avoid this completely.

The aircraft seat fixation device comprises a plurality of seat feet 28a, 30a. The seat feet 28a, 30a are in particular embodied as seat base structure feet. The aircraft seat fixation device in particular comprises four seat feet 28a, 30a. The aircraft seat fixation device comprises two front seat feet 28a, 30a and two rear seat feet 28a, 30a, of which only the two front seat feet 28a, 30a are shown in detail. The illustrated front seat feet 28a, 30a and the rear seat feet 28a, 30a may here be implemented identically or may have different implementations. Principally it is also conceivable that the aircraft seat fixation device comprises a different number of seat feet 28a, 30a. The seat feet 28a, 30a are configured for a coupling of the seat base structure 14a with an aircraft structure 12a. The seat feet 28a, 30a are each fixedly connected with the base frame 16a via a seat foot connection 32a, 34a. Via the seat foot connections 32a, 34a the seat feet 28a, 30a are coupled with the base frame 16a in a loss-proof manner. The aircraft seat fixation device comprises one fitting element 40a, 42a per each seat foot 28a, 30a. The fitting elements 40a, 42a are configured for a coupling with the fixation rails 36a, 38a. In a mounted state the fitting elements 40a, 42a are arranged with a first end in the fixation rail 36a, 38a. A second end of the fitting elements 40a, 42a is in the mounted state fixedly coupled with a seat foot 28a, 30a. The seat feet 28a, 30a are respectively connected with the fixation rail 36a, 38a via the fitting element 40a, 42a.

The aircraft seat fixation device comprises a plurality of compensation units 44a, 46a. In particular, the aircraft seat fixation device comprises one compensation unit 44a, 46a per seat foot 28a, 30a. The compensation units 44a, 46a are configured to permit a compensation movement of the seat base structure 14a in an overload case. The compensation units 44a, 46a are in particular configured to permit a compensation movement of the seat base structure 14a relative to the aircraft structure 12a. The compensation units 44a, 46a are respectively arranged on the seat feet 28a, 30a. The compensation units 44a, 46a are in particular respectively arranged between a seat foot 28a, 30a and the base frame 16a of the seat base structure 14a. The compensation units 44a, 46a are implemented identically, and thus only the one compensation unit 44a will be described in detail in the following. For an explanation of the compensation unit 46a and of the further compensation units not shown in the figures, the following description of the compensation unit 44a may be referred to. The compensation unit 44a is integrated in the seat foot connection 32a, via which the seat foot 28a is connected to the seat base structure 14a. The compensation unit 44a is realized integrally with the seat foot connection 32a. The compensation unit 44a comprises a central swivel pin 48a. The seat foot 28a and the base frame 16a are coupled with each other via the swivel pin 48a of the compensation unit 44a. The swivel pin 48a has a cylindrical shape. However, principally it would also be conceivable for the swivel pin to be implemented at least partly conically. Principally it would also be conceivable that the compensation unit 44a comprises instead of the central swivel pin 48a a slotted guide, which would in particular be arranged eccentrically to a position of the swivel pin 48a. The slotted guide could then be realized, for example, by curved long holes, in which corresponding pin elements are guided by clearance fit. A slotted guide could here in particular be implemented by at least two bearing points. Preferably, however, the slotted guide forms four bearing points. The swivel pin 48a in particular forms a rotation axle 50a, via which the seat foot 28a is pivotable relative to the base frame 16a. The seat foot 28a is positioned relative to the base frame 16a by way of the swivel pin 48a. By the swivel pin 48a, the seat foot 28a is coupled with the seat base structure 14a in a positionally fixed manner. The swivel pin 48a is implemented fixedly with the seat foot 28a. The swivel pin 48a is herein preferably embodied integrally with the seat foot 28a. Principally it would also be conceivable that the swivel pin 48a is fixedly coupled with the seat foot 28a in another way, e. g. via a force-fit and/or form-fit connection and/or via substance-to-substance bond. The base frame 16a comprises a receiving hole 68a, in which the swivel pin 48a is arranged in a mounted state. The swivel pin 48a is arranged in the receiving hole 68a via a clearance fit, allowing the swivel pin 48a in particular to easily turn in the receiving hole 68a.

The compensation unit 44a comprises four connection members 52a, 54a, 56a, 58a, which are arranged eccentrically to the swivel pin 48a. The connection members 52a, 54a, 56a, 58a are embodied as screw elements. The connection members 52a, 54a, 56a, 58a are connected with the seat foot 28a in a positionally fixed manner. For this purpose the seat foot 28a has four through holes 60a, which respectively one of the connection members 52a, 54a, 56a, 58a is guided through, in a mounting plane. For a connection of the connection members 52a, 54a, 56a, 58a, the base frame 16a has four through holes 70a, 72a, 74a, 76a. In a mounted state the connection members 52a, 54a, 56a, 58a are guided through respectively one of the through holes 70a, 72a, 74a, 76a. The through holes 70a, 72a, 74a, 76a respectively have equal distances to the central swivel pin 48a and have equal lengths. The through holes 70a, 72a, 74a, 76a are herein arranged spaced apart, in a circumferential direction, around the swivel pin 48a. The through holes 70a, 72a, 74a, 76a are implemented as curved long holes. The through holes 70a, 72a, 74a, 76a respectively have equal curvature radii. The through holes 70a, 72a, 74a, 76a in particular have a width that is larger than a middle region, i. e. a shaft region of the connection members 52a, 54a, 56a, 58a. Principally it would also be conceivable that the through holes 70a, 72a, 74a, 76a have any other shape permitting a respective desired rotation in an overload case.

The compensation unit 44a comprises a positioning unit 78a. The positioning unit 78a comprises a holding plate 80a. The holding plate 80a is configured for a positioning of the connection members 52a, 54a, 56a, 58a. The holding plate 80a is configured as a shared washer for the connection members 52a, 54a, 56a, 58a. The holding plate 80a is arranged between a head of the connection members 52a, 54a, 56a, 58a and the base frame 16a, in particular the transversal beam 18a. The holding plate 80a is configured such that a force acting through the head of the connection members 52a, 54a, 56a, 58a, which are embodied as screws, onto the transversal beam 18a acts onto a larger contact surface of the transversal beam 18a. The holding plate 80a is arranged on an inner side of the transversal beam 18a, which is situated opposite the seat foot 28a, and abuts on the transversal beam 18a. The holding plate 80a comprises four through holes 82a, 84a, 86a, 88a, through which respectively one of the connection members 52a, 54a, 56a, 58a is guided. The holding plate 80a is preferably embodied as a milled plate, for example of a stainless steel. By way of the holding plate 80a, a mounting of the seat foot 28a is possible that is easier and positionally more precise. Principally it would also be conceivable that each connection member 52a, 54a, 56a, 58a has a separate washer or, for example, respectively two connection members 52a, 54a, 56a, 58a have a shared holding plate that is embodied as a washer. Principally it would then be also conceivable that the washers comprise retaining springs. The positioning unit 78a comprises securing members (not shown in detail), by means of which the connection members 52a, 54a, 56a, 58a are secured in the through holes 70a, 72a, 74a, 76a and in the through holes 60a. The securing members are then in particular implemented as inner threads in the through holes 60a. Preferably, the securing means are then in particular implemented as bushings inserted in the through holes 70a, 72a, 74a, 76a and respectively having inner threads. The securing members implemented as inner threads are implemented correspondingly to the outer threads of the connection members 52a, 54a, 56a, 58a which are implemented as screws. Principally it is also conceivable that the securing members are implemented as nuts. By a tightening of the connection members 52a, 54a, 56a, 58a implemented as screws in the securing members implemented as inner threads, the seat foot 28a and the base frame 16a are pressed together with their mounting surfaces and are thus tensioned against each other. The base frame 16a and the seat foot 28a are connected to each other in a force-fit manner via the connection members 52a, 54a, 56a, 58a, the holding plate 80a and the securing members of the positioning unit 78a. In a normal operation state, the connection members 52a, 54a, 56a, 58a are positioned by the positioning unit 78a in a normal position in the corresponding through hole 70a, 72a, 74a, 76a. In the normal position the connection members 52a, 54a, 56a, 58a are positioned centrally in the respective through hole 70a, 72a, 74a, 76a. By a force-fit coupling of the seat foot 28a with the base frame 16a via the connection members 52a, 54a, 56a, 58a and the securing members of the positioning unit 78a, the seat foot 28a and the base frame 16a are rigidly connected to each other until a defined maximum force, and are in particular not rotatable relative to each other. The defined maximum force is defined by a preload force by which the connection members which are implemented as screws are tightened. The higher the preload force, the higher is a defined maximum force which is transferable between the seat foot 28a and the base frame 18a via the force-fit connection. If the defined maximum force is exceeded, the force-fit connection between the seat foot 28a and the base frame 16a is released and the seat foot 28a can rotate around the rotation axle 50a relative to the base frame 16a. Because of the defined maximum force, which is adjustable via the preload force and on excess of which the compensation unit 44a permits a compensation movement, it is possible for the aircraft seat fixation device to be adapted to different aircraft seats and aircraft seat superstructures in a particularly simple manner.

The compensation units 44a, 46a are configured, in an overload case, to permit a rotation of the respective seat foot 28a, 30a around the rotation axle 50a realized by the respective swivel pin 48a of the compensation unit 44a, 46a relative to the seat base structure 14a, in particular the base frame 16a. The compensation units 44a, 46a are in particular configured to permit a compensation movement, i. e. a rotation by at least two degrees. The compensation units 44a, 46a limit the compensation movement, i. e. the rotation around the swivel pin 48a, to 11 degrees in both rotation directions. Principally it would also be conceivable that the rotation is limited to 15 degrees. The compensation movements executed by the compensation units 44a, 46a are substantially free of elastic or plastic deformation. The compensation movements are induced solely by a rotation of the swivel pin 48a in the corresponding receiving hole 68a. As can be perceived in FIG. 1, the individual compensation units 44a, 46a may execute differently dimensioned compensation movements in an overload case. The individual compensation units 44a, 46a are capable of executing compensation movements independently from each other. In an overload case, in which in particular an aircraft structure, i. e. in particular the cabin floor, gets twisted, the seat base structure 14a can be uncoupled from the aircraft structure 12a by way of the compensation units 44a, 46a. In this way in particular an excessive twisting of the base frame 16a of the seat base structure 14a is preventable. As in an overload case, due to using the compensation units 44a, 46a, less large forces act onto the seat base structure 14a and in particular on the base frame 16a, it is possible for the base frame 16a to be implemented weaker, i. e. in particular more lightweight, in comparison to a base frame without the compensation units 44a, 46a.

Principally it would as well be conceivable that the compensation units 44a, 46a are not arranged between the seat feet 28a, 30a and the base frame 16a but are integrated in the base frame 16a, are arranged between the seat feet 28a, 30a and the respective fitting elements 40a, 42a or are, for example, just integrated in the seat feet 28a, 30a. In such cases also different compensation movements are conceivable which are executed by the compensation units 44a, 46a. It is herein in particular also conceivable that the compensation units 44a, 46a execute only a linear movement or a combination of a linear movement and a rotation movement as a compensation movement.

In FIGS. 5 to 14 four further exemplary embodiments of the invention are illustrated. The following descriptions are essentially limited to the differences between the exemplary embodiments, wherein regarding identically denominated structural components, in particular regarding structural components having the same reference numerals, the drawings and/or the description of the other exemplary embodiments, in particular of FIGS. 1 to 4, may principally be referred to as well. To distinguish between the exemplary embodiments, the letter a has been added to the reference numerals of the exemplary embodiment of FIGS. 1 to 4. In the exemplary embodiments of FIGS. 5 to 14 the letter a has been substituted by the letters b to e.

FIGS. 5 to 7 show a second exemplary embodiment of an aircraft seat fixation device according to the invention. The aircraft seat fixation device is part of an aircraft seat arrangement 10b. The aircraft seat arrangement 10b comprises an aircraft seat. The aircraft seat is implemented as a business-class or first-class aircraft seat. The aircraft seat arrangement 10b further comprises an aircraft seat superstructure. The aircraft seat superstructure is here implemented as a superstructure that forms a housing for the aircraft seat and in particular a console with depositing facilities and, for example, also a foot space for a further aircraft seat. The aircraft seat superstructure and the aircraft seat itself shall not be described here further, and they are not shown in detail in the figures. The aircraft seat arrangement 10b is configured to be installed in an aircraft. The aircraft seat arrangement 10b is in particular configured to be mounted in an aircraft cabin. The aircraft cabin implements an aircraft structure 12b. The aircraft structure 12b is embodied as a cabin floor. For a connection of aircraft seat arrangements 10b, the aircraft cabin comprises fixation rails, which are inserted in the aircraft structure 12b that is embodied as a cabin floor and which are not shown in detail.

The aircraft seat fixation device comprises a seat base structure 14b. The seat base structure 14b is in particular part of the aircraft seat arrangement 10b. The seat base structure 14b is configured such that at least the aircraft seat is mounted thereon. The seat base structure 14b is implemented by a base frame 16b. Equivalently to the first exemplary embodiment, the base frame 16b comprises two transversal beams 18b, 20b and at least two longitudinal beams 22b. Principally it is also conceivable that the base frame 16b comprises three longitudinal beams 22b like in the first exemplary embodiment. The transversal beams 18b, 20b are connected to each other via the longitudinal beams 22b. The transversal beams 18b, 20b and the longitudinal beams 22b are respectively connected to one another fixedly, preferably in particular rigidly. In particular, the transversal beams 18b, 20b and the longitudinal beams 22b are respectively screwed with one another. The figures show only the one longitudinal beam 22b. The longitudinal beam 22b shown is in particular embodied as an outer longitudinal beam 22b, which delimits the base frame 16b laterally. The longitudinal beam 22b is in particular arranged in a region of one of the two fixation rails via which the base frame 16b is connected to the cabin floor. The opposite-situated longitudinal beam, which is not shown in detail, is implemented identically and is in particular also connected to the cabin floor, in particular the fixation rails, in a same manner. The base frame 16b realizes a basic structure for the aircraft seat and for the aircraft seat superstructure.

The base frame 16b is coupled with the fixation rails on its rear side via two rear fitting elements 90b. The rear fitting elements 90b are configured to be coupled with respectively one fixation rail in a force-fit and/or form-fit manner. The rear fitting elements 90b are in particular configured to be coupled with the respective fixation rail in a positionally fixed manner. In a mounted state the rear fitting elements 90b are preferentially fixated axially and horizontally in the respective fixation rail. The rear fitting elements 90b are coupled with the rear transversal beam 20b. The base frame 16b comprises respectively two coupling elements 92b, 94b, via which respectively one rear fitting element 90b is connected to the base frame 16b. The first coupling element 92b is rigidly connected to the rear transversal beam 20b. Preferably the first coupling element 92b is fixedly and rigidly connected to the rear transversal beam 20b via several screw connections. In a mounted state the first coupling element 92b protrudes below and beyond the rear transversal beam 20b. The first coupling element 92b is preferably implemented of a rectangular cuboid. In particular, the first coupling element 92b is preferably implemented of a full material. On its lower end the coupling element 92b comprises a connection element, via which the first coupling element 92b is connectable to the second coupling element 94b. The connection element is realized as a through hole. The second coupling element 94b is connected to the first coupling element 92b, by a screw connection, via the connection element that is realized as a through hole. The screw connection preferably forms a rotation axle, via which in an overload case a compensation movement can take place between the two coupling elements 92b, 94b, and thus between the base frame 16b and the rear fitting element 90b. The second coupling element 94b is with a front end connected to the first coupling element 92b. On a rear end the second coupling element 94b is coupled with the rear fitting element 90b. The second coupling element 94b is connected to the rear fitting element 90b via a bolt 96b. Principally it is also conceivable that the second coupling element 94b is connected to the rear fitting element 90b via a screw connection. The bolt 96b realizes a rotation axle via which the second coupling element 94b can be rotated relative to the rear fitting element 90b at least in an overload case.

The aircraft seat fixation device comprises two additional lower longitudinal beams 98b. The two additional lower longitudinal beams 98b are respectively arranged in the region of the two longitudinal beams 22b of the base frame 16b. The aircraft seat fixation device in particular comprises one additional lower longitudinal beam 98b per each longitudinal beam 22b of the base frame 16b arranged above a fixation rail. In the mounted state the two additional lower longitudinal beams 98b are in particular arranged in a region of the guide rails. The base frame 16b is in a front portion coupled with the additional lower longitudinal beam 98b. The base frame 16b is at least partly arranged on the additional lower longitudinal beam 98b. On a rear end the additional lower longitudinal beam 98b has a receptacle by which it is connected to the second coupling element 94b, respectively the rear fitting element 90b, by means of the bolt 96b. The longitudinal beam 98b is preferably rotatably coupled with the second coupling element 94b, respectively the rear fitting element 90b.

The aircraft seat fixation device comprises two front seat feet 28b. The seat feet 28b are in particular implemented as seat base structure feet. The seat feet 28b are configured for a coupling of the seat base structure 14b with the aircraft structure 12b. The seat feet 28b are respectively fixedly connected with respectively one of the additional lower longitudinal beams 98b. The seat feet 28b are connected to a front end of the additional lower longitudinal beam 98b. Preferably the seat feet 28b are rigidly connected to the additional longitudinal beam 98b. The aircraft seat fixation device comprises a fitting element 40b per each seat foot 28b. The fitting elements 40b are configured for a coupling with the fixation rails. In a mounted state the fitting elements 40b are arranged with a first end in the fixation rail. A second end of the fitting elements 40b is in a mounted state fixedly coupled with a seat foot 28b. The seat feet 28b are respectively connected with the corresponding fixation rail via the fitting element 40b. The additional lower longitudinal beam 98*b* is fixedly connected with the fixation rail, which is not shown in detail, via the fitting element 40*b*. The seat foot 28*b*, and thus the additional lower longitudinal beam 98*b*, are fixated in the fixation rail in a vertical direction. In an axial direction, the fitting element 40*b*, and thus the seat foot 28*b* and the additional lower longitudinal beam 98*b*, are clamped and thereby axially fixated in the fixation rail via a spring element.

The aircraft seat fixation device comprises a plurality of compensation units 44*b*. The aircraft seat fixation device comprises two compensation units 44*b*. In particular, the aircraft seat fixation device comprises respectively one compensation unit 44*b* per each additional lower longitudinal beam 98*b*. The aircraft seat fixation device in particular comprises respectively one compensation unit 44*b* per each longitudinal beam 22*b* arranged above a fixation rail. The compensation units 44*b* are configured to permit a compensation movement of the seat base structure 14*b* in an overload case. The compensation units 44*b* are in particular configured to permit a compensation movement of the base frame 16*b* in an overload case. In particular, the compensation units 44*b* are configured to permit a compensation movement of the seat base structure 14*b*, in particular of the base frame 16*b*, relative to the cabin floor. The compensation units 44*b* are preferably in particular configured to permit a compensation movement between the front fitting elements 40*b* and the rear fitting elements 90*b*, in particular without deforming the base frame 16*b* in a longitudinal direction. The compensation units 44*b* are in particular configured such that it is possible, in an overload case, for a seat base structure 14*b*, in particular the base frame 16*b*, to move relative to the cabin floor. In particular, the compensation units 44*b* are configured such that, in an overload case, the base frame 16*b* can pivot relative to the cabin floor around an axis extending in a transverse direction. The compensation units 44*b* are respectively arranged between the one additional lower longitudinal beam 98*b* and the base frame 16*b*. The compensation units 44*b* are in particular arranged functionally between the one additional lower longitudinal beam 98*b* and the base frame 16*b*. The compensation units 44*b* are in particular arranged in a front region of the additional longitudinal beam 98*b* that faces toward the front seat foot 28*b*. Preferably the compensation units 44*b* are in particular configured, in an overload case, to enable a height adjustment between the front fitting element 40*b* and the rear fitting element 90*b*. The compensation units 44*b* are configured such that it is possible for the front fitting element 40*b*, and thus also a front portion of the additional longitudinal beam 98*b*, to get lowered relative to the rear fitting element 90*b*, with the base frame 16*b* preferably remaining substantially in a same, preferably horizontal, position.

The compensation unit 44*b* comprises a lever element 100*b*. The lever element 100*b* is connected with the additional lower longitudinal beam 98*b* via a bearing 102*b*, which is not shown in detail. The lever element 100*b* is, preferably pivotally, coupled with the additional longitudinal beam 98*b* via the bearing 102*b*. Preferentially the lever element 100*b* is supported such that it is eccentrically rotatable around a rotation axis. Advantageously the lever element 100*b* is coupled with the additional longitudinal beam 98*b* via a combination of a linear bearing and a rotational bearing. The lever element 100*b* is in particular connected to the additional longitudinal beam 98*b* with a lower portion. The lever element 100*b* is connected to the base frame 16*b* with an upper end. The compensation unit 44*b* comprises a holder 104*b*. The holder 104*b* is fixedly connected with the base frame 16*b*, in particular with the front transversal beam 18*b*. The holder 104*b* is in particular fixedly connected on an underside of the front transversal beam 18*b*. The holder 104*b* comprises a receptacle, via which the lever element 100*b* is pivotally connected to the holder 104*b*. Preferably the lever element 100*b* is pivotally connected to the holder 104*b*, and thus to the base frame 16*b*, via a bolt 106*b*.

In a normal operation state the compensation unit 44*b* is in a normal position. In the normal position the lever element 100*b* lies essentially flatly upon the additional lower longitudinal beam 98*b* (see FIG. 5). In the normal position the lever element 100*b* is oriented substantially parallel to the additional longitudinal beam 98*b*. In the normal position of the compensation unit 44*b*, the base frame 16*b*, in particular the longitudinal beam 22*b*, is oriented parallel to the additional longitudinal beam 98*b*. In the normal operation state the compensation unit 44*b* is locked in the normal position by the mass of the elements assembled on the base frame 16*b* and their mass inertia. Principally it would also be conceivable that the compensation unit 44*b* comprises a locking unit that additionally locks the compensation unit 44*b* in the normal operation state until a defined trigger force is reached. In an overload case (in particular 16G test) the compensation unit 44*b* is configured to be adjusted into an overload position. In an overload position the lever element 100*b* is pivotable relative to the additional longitudinal beam 98*b* via the bearing 102*b* and relative to the base frame 16*b* via the bolt 106*b* and the holder 104*b*. The lever element 100*b* is adjustable from the normal position to a maximally pivoted position (see FIG. 7). In the maximally pivoted position of the lever element 100*b*, the lever element 100*b* is oriented almost orthogonally to the additional longitudinal beam 98*b*. The lever element 100*b* is continuously adjustable between the normal position and the maximally pivoted position. By the pivoting of the lever element 100*b* in an overload position, a distance and an angle between the additional longitudinal beam 98*b* and the base frame 16*b* are increased. This in particular enables a lowering of the front fitting element 40*b* and a front portion of the additional longitudinal beam 98*b*, for example by a deformation of the cabin floor, an orientation of the base frame 16*b* remaining substantially the same.

The compensation unit 44*b* comprises a blocking unit 108*b*. The blocking unit 108*b* is configured for blocking the lever element 100*b* in different positions between its normal position and the maximally pivoted position. The blocking unit 108*b* is in particular configured to prevent, after an adjustment from the normal position toward the maximally pivoted position, a resetting of the lever element 100*b* back to its normal position. For a blocking of the lever element 100*b*, the blocking unit 108*b* comprises a toothing (not shown in detail) and an engagement element that is capable of engaging into different teeth of the toothing in different positions of the lever element 100*b* in order to block the lever element 100*b*. It is preferably conceivable that the toothing of the lever element 100*b* and the engagement element are formed by the additional longitudinal beam 98*b*, or that the toothing is formed by the additional longitudinal beam 98*b* and the engagement element is formed by the lever element 100*b*. Preferably the lever element 100*b* is blockable by the blocking unit 108*b* at least substantially continuously between its normal position and its maximally pivoted position. "Substantially continuously blockable" is here in particular to mean that, from any position between the normal position and the maximally pivoted position, a blocking of the lever element 100b will occur after a further pivoting by maximally 3 degrees, preferentially maximally 1 degree.

FIGS. 8 to 10 show a third exemplary embodiment of an aircraft seat fixation device according to the invention. The aircraft seat fixation device is part of an aircraft seat arrangement 10c. The aircraft seat arrangement 10c comprises an aircraft seat. The aircraft seat is implemented as a business-class or first-class aircraft seat. The aircraft seat arrangement 10c further comprises an aircraft seat superstructure. The aircraft seat superstructure is herein implemented as a structure forming a housing for the aircraft seat as well as in particular a console with depositing facilities and, for example, also a foot space for a further aircraft seat. The aircraft seat superstructure and the aircraft seat itself shall not be further described here and are not shown in detail in the figures. The aircraft seat arrangement 10c is configured to be installed in an aircraft. The aircraft seat arrangement 10c is configured to be mounted in an aircraft cabin. The aircraft cabin forms an aircraft structure 12c. The aircraft structure 12c is implemented as a cabin floor. For a connection of aircraft seat arrangements 10c the aircraft cabin comprises fixation rails (not shown in detail), which are inserted in the aircraft structure 12c that is implemented as a cabin floor.

The aircraft seat fixation device comprises a seat base structure 14c. The seat base structure 14c is in particular part of the aircraft seat arrangement 10c. The seat base structure 14c is configured such that at least the aircraft seat is mounted thereon. The seat base structure 14c is implemented by a base frame 16c. The base frame 16c comprises, equivalently to the first exemplary embodiment, two transversal beams 18c, 20c and at least two longitudinal beams 22c. The transversal beams 18c, 20c and the longitudinal beams 22c are respectively connected to each other in a fixed manner, preferably in particular in a rigid manner. In particular, the transversal beams 18c, 20c and the longitudinal beams 22c are respectively screwed with one another. In the figures only the one longitudinal beam 22c is illustrated.

The base frame 16c is coupled with the guide rails on its rear side via two rear fitting elements 90c. The rear fitting elements 90c are configured to be coupled with respectively one guide rail in a force-fit and/or form-fit manner. The rear fitting elements 90c are in particular configured to be coupled with the respective guide rail in a positionally fixed manner. In a mounted state the rear fitting elements 90c are preferentially fixated axially and horizontally in the respective guide rail. The rear fitting elements 90c are coupled with the rear transversal beam 20c. The base frame 16c comprises respectively two coupling elements 92c, 94c, via which respectively one rear fitting element 90c is connected to the base frame 16c. The rear fitting element 90c is connected to the base frame 16c in a manner that is equivalent to the second exemplary embodiment. The coupling elements 92c, 94c are also implemented substantially identically to those of the second exemplary embodiment.

The aircraft seat fixation device comprises two front seat feet 28c. The seat feet 28c are in particular implemented as seat base structure feet. The seat feet 28c are configured for a coupling of the seat base structure 14c with the aircraft structure 12c. The seat feet 28c are respectively connected with the front transversal beam 18c. The aircraft seat fixation device comprises one fitting element 40c per each seat foot 28c. The fitting elements 40c are configured for a coupling with the fixation rails. In a mounted state the fitting elements 40c are arranged with a first end in the fixation rail. A second end of the fitting elements 40c is in a mounted state fixedly coupled with a seat foot 28c.

The aircraft seat fixation device comprises several compensation units 44c. The aircraft seat fixation device comprises two compensation units 44c. In particular, the aircraft seat fixation device comprises one compensation unit 44c per each seat foot 28c. The compensation units 44c implement a connection of the fitting element 44c and of the seat foot 28c to the base frame 16c. Preferably the compensation units are integrated in a connection of the fitting element 44c and of the seat foot 28c to the base frame 16c. The compensation units 44c are configured to permit a compensation movement of the seat base structure 14c in an overload case. The compensation units 44c are in particular configured to permit a compensation movement of the base frame 16c in an overload case. In particular, the compensation units 44c are configured to permit a compensation movement of the seat base structure 14c, in particular the base frame 16c, relative to the cabin floor. The compensation units 44c are respectively arranged function-wise between the fitting element 40c and the base frame 16c.

The seat feet 28c are in a normal operation state respectively connected to the transversal beam 18c via a holding element 112c. The holding element 112c is part of the compensation unit 44c. The holding element 112c is fixedly connected with the front transversal beam 18c. The holding element 112c comprises two holding lugs 114c, which are spaced apart from each other and which the seat foot 28c is arranged between. The holding lugs 114c respectively form a form-fit receptacle 116c. The form-fit receptacles 116c are configured to allow a bolt to be held by them in a form-fit manner in a normal operation state. The seat foot 28c comprises a fixation sleeve 118c. The fixation sleeve 118c is part of the compensation unit 44c. The fixation sleeve 118c is configured to connect a front fitting element 40c to the seat foot 28c. The front fitting element 40c is fixedly inserted in the fixation sleeve 118c on a lower end. The fitting element 40c protrudes with a lower end, which is configured for a coupling with the fixation rail, out of the lower end of the fixation sleeve 118c.

The fixation sleeve 118c is connected within the seat foot 28c. The fixation sleeve 118c is preferably supported in the seat foot 28c, in particular such that it is axially displaceable. The fixation sleeve 118c is supported in a receptacle of the seat foot 28c via a slide bearing. The compensation unit 44c comprises a holding bolt 120c. The holding bolt 120c is fixedly connected with the fixation sleeve 118c. The holding bolt 120c protrudes sidewise beyond the fixation sleeve 118c. The holding bolt 120c preferably protrudes in particular sidewise out of the seat foot 28c. The seat foot 28c has respectively one long hole 122c in its two side walls. The holding bolt 120c extends through the two long holes 122c. The long holes 122c preferably extend from an upper region of the seat foot 28c to a lower region of the seat foot 28c. The holding bolt 120c is guided on the seat foot 28c via the long holes 122c. Via the holding bolt 120c and the long holes 122c, the fixation sleeve 118c is coupled with the seat foot 28c axially along the long holes 122c. In a normal operation state the holding bolt 120c is arranged at an upper end of the long holes 122c and is secured in this position by means of the holding element 112c. The holding bolt 120c is in the normal position preferably fixated in a form-fit manner via the form-fit receptacles 116c of the holding element 112c. By way of the form-fit fixation of the holding bolt 120c at an upper end of the long holes 122c, the fixation sleeve 118c, and by this the entire seat foot 28c, is in the normal operation state fixated on the base frame 16c in an operationally safe manner.

The compensation unit 44c comprises per each seat foot 28c a bolt connection via which the seat feet 28c are additionally connected to the base frame 16c, in particular to the front transversal beam 18c. The seat feet 28c are respectively coupled with the transversal beam 18c via a bolt 110c. Each bolt 110c is preferably in particular configured for securing a seat foot 28c at the base frame 16c in a trigger position of the compensation unit 44c. In the normal position a base-frame-side abutment 124c of the bolt 110c is preferably arranged spaced apart from the base frame 16c. In case of a triggering the seat foot 28c can get released from the base frame 16c until the base-frame-side abutment 124c of the bolt 110c abuts on the base frame 16c. In a normal operation state the seat foot 28c is fixated at the base frame 16c via the form-fit connection of the holding bolt 120c with the form-fit receptacle 116c of the holding element 112c and with the bolt 110c. In the normal operation state the bolt 110c is tensioned with the seat foot 28c and the front transversal beam 18c by the normal forces, in particular weight forces, acting in the normal operation state, thus fixating the seat foot 28c and the front transversal beam 18c relative to each other.

The compensation unit 44c comprises a blocking unit 108c. The blocking unit 108c is configured for blocking the fixation sleeve 118c in different positions relative to the seat foot 28c. The blocking unit 108c is in particular configured for blocking the fixation sleeve 118c in differently far pulled-out positions relative to the seat foot 28c. The blocking unit 108c comprises a plurality of grooves 126c placed in an outer surface of the fixation sleeve 118c. The grooves 126c are placed in the fixation sleeve 118c spaced apart from each other in a vertical direction of the fixation sleeve 118c. The blocking unit 108c comprises a leaf spring element 128c, which is configured, for a blocking of the fixation sleeve 118c in different positions, to engage into the different grooves 126c of the blocking unit 108c.

In an overload case the form-fit receptacles 116c of the holding element 112c are configured to be deformed plastically, in particular to break open. The form-fit receptacles 116c of the holding element 112c are in particular configured to break open when a critical load is reached. By the form-fit receptacles 116c of the holding element 112c breaking open, the holding bolt 120c is released. In a released state the holding bolt 120c can slide along in the corresponding long holes 122c of the seat foot 28c. This enables the fixation sleeve 118c, together with the fitting element 40c that is fixated therein, to move relative to the seat foot 28c, in particular to be deployed out of the seat foot 28c downwards. This allows a distance between the fitting element 40c and the base frame 16c to be increased via the compensation unit 44c. As a result it is, for example, possible for a deformation of the cabin floor to be compensated, in particular by the front fitting elements 40c lowering relative to the rear fitting elements 90c. In this way an introduction of a force and/or a deformation of the seat base structure 14c, in particular the base frame 16c, is preventable in an overload case. If in the overload case the fixation sleeve 118c and the front fitting element 40c have been deflected by the impacting forces and the forces get abated, the blocking unit 108c blocks the fixation sleeve 118c, and thus the front fitting elements 40c, relative to the base frame 16c. Forces may in particular also be transferred via the blocking unit 108c in a 16G crash test and may in particular be introduced from the seat base structure 14c into the cabin floor via the blocking unit 108c.

FIGS. 11 to 13 show a fourth exemplary embodiment of an aircraft seat fixation device according to the invention. The aircraft seat fixation device is part of an aircraft seat arrangement 10d. The aircraft seat arrangement 10d comprises an aircraft seat. The aircraft seat is implemented as a business-class or first-class aircraft seat. The aircraft seat arrangement 10d further comprises an aircraft seat superstructure. The aircraft seat superstructure is herein implemented as a structure forming a housing for the aircraft seat and in particular a console with depositing facilities and, for example, also a foot space for a further aircraft seat. Neither the aircraft seat superstructure nor the aircraft seat itself shall be described here further and they are not illustrated in detail in the figures. The aircraft seat arrangement 10d is configured to be installed in an aircraft. The aircraft seat arrangement 10d is in particular configured to be mounted in an aircraft cabin. The aircraft cabin realizes an aircraft structure 12d. The aircraft structure 12d is implemented as a cabin floor. For a connection of aircraft seat arrangements 10d, the aircraft cabin comprises fixation rails (not shown in detail), which are inserted in the aircraft structure 12d that is implemented as a cabin floor. The aircraft seat fixation device comprises a seat base structure 14d. The seat base structure 14d is in particular part of the aircraft seat arrangement 10d. The seat base structure 14d is configured such that at least the aircraft seat is mounted thereon. The seat base structure 14d is implemented by a base frame 16d. The base frame 16d comprises, equivalently to the first exemplary embodiment, two transversal beams 18d, 20d and at least two longitudinal beams 22d. The transversal beams 18d, 20d and the longitudinal beams 22d are respectively connected to one another in a fixed manner, preferably in particular in a rigid manner. In particular, the transversal beams 18d, 20d and the longitudinal beams 22d are respectively screwed with one another. In the figures only the one longitudinal beam 22d is illustrated. The base frame 16d is on its rear side coupled with the guide rails via two rear fitting elements 90d. The rear fitting elements 90d are configured to be coupled with respectively one guide rail by a force-fit and/or form-fit connection. The rear fitting elements 90d are in particular configured to be coupled with the respective guide rail in a positionally fixed manner. In a mounted state the rear fitting elements 90d are preferably fixated axially and horizontally in the respective guide rail. The rear fitting elements 90d are coupled with the rear transversal beam 20d. The base frame 16d comprise respectively two coupling elements 92d, 94d, via which respectively one rear fitting element 90d is connected to the base frame 16d. The rear fitting element 90d is connected to the base frame 16d equivalently to the second exemplary embodiment. The coupling elements 92d, 94d are also implemented substantially identically to those of the second exemplary embodiment.

The aircraft seat fixation device comprises two front seat feet 28d. The seat feet 28d are in particular realized as seat base structure feet. The seat feet 28d are configured for a coupling of the seat base structure 14d with an aircraft structure 12d. The seat feet 28d are respectively fixedly connected with the front transversal beam 18d. The front seat feet 28d are preferably fixedly connected to the base frame 16d, in particular the front transversal beam 18d, by a screw connection. The aircraft seat fixation device comprises per each seat foot 28d a fitting element 40d. The fitting elements 40d are configured for coupling with the fixation rails. In a mounted state, the fitting elements 40*d* are arranged with a first end in the fixation rail. A second end of the fitting elements 40*d* is in a mounted state fixedly coupled with a seat foot 28*d*.

The aircraft seat fixation device comprises several compensation units 44*d*. The aircraft seat fixation device comprises two compensation units 44*d*. In particular, the aircraft seat fixation device comprises one compensation unit 44*d* per each seat foot 28*d*. The compensation units 44*d* form a connection of the fitting element 40*d* and the seat foot 28*d* to the base frame 16*d*. Preferably the compensation units 44*d* are integrated in a connection of the fitting element 40*d* and the seat foot 28*d* to the base frame 16*d*. The compensation units 44*d* are configured to permit a compensation movement of the seat base structure 14*d* in an overload case. The compensation units 44*d* are in particular configured to permit a compensation movement of the base frame 16*d* in an overload case. In particular, the compensation units 44*d* are configured to permit a compensation movement of the seat base structure 14*d*, in particular the base frame 16*d*, relative to the cabin floor. The compensation units 44*d* are respectively arranged function-wise between the fitting element 40*d* and the base frame 16*d*.

The seat foot 28*d* comprises a fixation sleeve 118*d*. The fixation sleeve 118*d* is part of the compensation unit 44*d*. The fixation sleeve 118*d* is configured to connect a front fitting element 40*d* to the seat foot 28*d*. The front fitting element 40*d* is fixedly inserted in the fixation sleeve 118*d* at a lower end. The fitting element 40*d* protrudes with a lower end, which is configured for a coupling with the fixation rail, out of the lower end of the fixation sleeve 118*d*.

The fixation sleeve 118*d* is connected to the seat foot 28*d*. The fixation sleeve 118*d* is preferably supported such that it is in particular axially displaceable in the seat foot 28*d*. The fixation sleeve 118*d* is supported in a receptacle of the seat foot 28*d* via a slide bearing. Differently than in the third exemplary embodiment, the fixation sleeve 118*d* is configured to be fixated in the seat foot 28*d* via friction-fit connection. The fixation sleeve 118*d* has in an upper region a friction surface 130*d*. The friction surface 130*d* is formed by a portion of an outer shell of the fixation sleeve 118*d*. The compensation unit 44*d* comprises a friction element 132*d*. The friction element 132*d* is embodied as a friction sleeve. The friction element 132*d* is configured, at least in a normal operation state, to create a friction-fit connection between the friction surface 130*d* of the fixation sleeve 118*d* and a shell surface 134*d* of the receptacle of the seat foot 28*d* in which the fixation sleeve 118*d* is supported. In a normal position of the compensation unit 44*d* the friction element 132*d* is arranged in a region of the friction surface 130*d* of the fixation sleeve 118*d*. In the normal position it is possible for axial forces to be introduced from the seat foot 28*d* into the front fitting element 40*d* via a friction-fit connection between the shell surface 234*d* and the friction element 132*d*, and the friction element 132*d* and the friction surface 130*d* of the fixation sleeve 118*d*. By this friction-fit connection, it is possible for forces occurring in normal operation to be transferred away from the seat foot 28*d* into the fitting element 40*d*, i. e. from the base frame 16*d* into the seat bottom.

The compensation unit 44*d* comprises a blocking unit 108*d*. The blocking unit 108*d* is configured for a blocking of the fixation sleeve 118*d* in different positions relative to the seat foot 28*d*. Differently than in the third exemplary embodiment, the blocking unit 108*d* is blockable by a friction-fit. The blocking unit 108*d* forms a friction conus 136*d* in an upper region of the fixation sleeve 118*d*, in particular above the friction surface 130*d*. The friction conus 136*d* tapers upwards. At an upper end the friction conus 136*d* has an outer diameter that is smaller than an inner diameter of the friction element 132*d* that is embodied as a friction sleeve. In an overload case, due to the fixation sleeve moving downward, the friction element 132*d* slips into a region above the friction conus 136*d*. This allows the fixation sleeve 118*d* to be moved downwards out of the seat foot 28*d* by the force impacting in an overload case, preferably without a counteracting friction force.

When the force has abated in the overload case, the blocking unit 108*d* blocks the fixation sleeve 118*d* by a friction force between the friction conus 136*d*, the friction element 132*d* and the shell surface 134*d*. By a short upward movement of the fixation sleeve 118*d*, the friction element 132*d* is pressed outward, towards the shell surface 134*d* of the receptacle of the seat foot 28*d*, by the conus surface 136*d* of the fixation sleeve 118*d*. As a result of this, the friction element 132*d* gets re-tensioned with the fixation sleeve 118*d* and the receptacle of the seat foot 28*d*. This enables, after an overload case and a triggering of the compensation unit 44*d*, a force to be transferred between the seat foot 28*d* and the fixation sleeve 118*d*, i. e. in particular between the base frame 16*d* and the front fitting element 40*d*, which means that it is in particular also possible for forces of a crash test (16G test) to be transferred.

FIG. 14 exemplarily shows a fifth exemplary embodiment of an aircraft seat fixation device according to the invention. Differently than in the fourth exemplary embodiment, only a friction-fit connection between a front seat foot 28*e* and a fixation sleeve 118*e* for a front fitting element 40*e* is implemented in a different manner. For a fixation of the fixation sleeve 118*e* in a normal operation state and for a blocking of the fixation sleeve 118*e* in a deployed state, a compensation device 44*e* comprises a spring element 138*e*. The spring element 138*e* is implemented as a spring pack. The spring element 138*e* is arranged in a lower region of the seat foot 28*e*. The spring element 138*e* is clamped between a lower end of the seat foot 28*e* and a counter-holder element 140*e*, which is fixedly connected with the seat foot 28*e*. The spring element 138*e* has a through hole. In a mounted state the fixation sleeve 118*e* is guided through the through hole. The fixation sleeve 118*e* is in a friction contact with the spring element 138*e*. In a normal operation state, a normal force occurring during operation can be transferred via the friction-fit connection between the spring element 138*e* and the fixation sleeve 118*e*. In an overload case the spring element 138*e* is deformed, by a force acting onto the fixation sleeve 118*e* downwards, such that a normal force onto the fixation sleeve 118*e* is reduced and a friction force between the fixation sleeve 118*e* and the spring element 138*e* becomes so small that the fixation sleeve 118*e* can move downwards. This enables the fixation sleeve 118*e* to move downwards in an overload case, the compensation unit 44*e* thus increasing a distance between a front fitting element 40*e* and a base frame 16*e*. In case of a force acting onto the fixation sleeve 118*e* upwards toward the seat foot 28*e*, the spring element 138*e* is deformed such that a normal force onto the fixation sleeve 118*e* is increased and thus a friction force between the spring element 138*e* and the fixation sleeve 118*e* is increased. As a result of this, a blocking unit 108*e* of the compensation unit 44*e* can also be realized by the spring element 138*e*. A principal functionality of the compensation unit 44*e* corresponds to the compensation units 44 of the exemplary embodiments two to four and will therefore not be described here once more in detail.

REFERENCE NUMERALS

- 10 aircraft seat fixation device
- 12 aircraft structure
- 14 seat base structure
- 16 base frame
- 18 transversal beam
- 20 transversal beam
- 22 longitudinal beam
- 24 longitudinal beam
- 26 longitudinal beam
- 28 seat foot
- 30 seat foot
- 32 seat foot connection
- 34 seat foot connection
- 36 fixation rail
- 38 fixation rail
- 40 fitting element
- 42 fitting element
- 44 compensation unit
- 46 compensation unit
- 48 swivel pin
- 50 rotation axle
- 52 connection member
- 54 connection member
- 56 connection member
- 58 connection member
- 60 through hole
- 68 receiving hole
- 70 through hole
- 72 through hole
- 74 through hole
- 76 through hole
- 78 positioning unit
- 80 holding plate
- 82 through hole
- 84 through hole
- 86 through hole
- 88 through hole
- 90 fitting element
- 92 coupling element
- 94 coupling element
- 96 bolt
- 98 longitudinal beam
- 100 lever element
- 102 bearing
- 104 holder
- 106 bolt
- 108 blocking unit
- 110 bolt
- 112 holding element
- 114 holding lugs
- 116 form-fit receptacle
- 118 fixation sleeve
- 120 holding bolt
- 122 long hole
- 124 abutment
- 126 groove
- 128 leaf spring
- 130 friction surface
- 132 friction element
- 134 shell surface
- 136 friction conus
- 138 spring element
- 140 counter-holder element

The invention claimed is:

1. An aircraft seat fixation device for a fixation at least of a portion of an aircraft seat on at least one fixation rail that is fixated on an aircraft structure, comprising:
    a seat base structure which is configured such that at least the aircraft seat is mounted thereon at least partially,
    at least one seat foot which is connected to the seat base structure,
    at least one fitting element which is connected to the seat foot and is at least configured to be coupled with the fixation rail,
    at least one compensation unit, which is arranged on the seat base structure, the seat foot and/or the fitting element and which is configured to permit at least one compensation movement of the seat base structure at least in an overload case,
    wherein the compensation unit comprises a swivel pin and at least one connection member, which is arranged eccentrically to the swivel pin and is arranged at least one-sidedly in a through hole,
    wherein the connection member is a connection element which is configured for a connection of at least two other elements and which is, in a connected state, configured to prevent a movement of the connected at least two other elements in a movement direction.

2. The aircraft seat fixation device according to claim 1, wherein the at least one compensation unit is arranged between the seat base structure and the seat foot.

3. The aircraft seat fixation device according to claim 1, wherein the compensation unit is integrated in a seat foot connection, via which the at least one seat foot is connected to the seat base structure.

4. The aircraft seat fixation device according to claim 1, wherein the compensation unit is configured, at least in an overload case, to permit at least a rotation of the seat foot around a rotation axle relative to the seat base structure.

5. The aircraft seat fixation device according to claim 1, wherein a compensation movement executed by the compensation unit is at least substantially free of elastic and/or plastic deformation.

6. The aircraft seat fixation device according to claim 1, wherein the compensation unit comprises at least one positioning unit which, at least in a normal operation state, positions the at least one connection member in the through hole in a normal position being arranged centrally in the through hole.

7. The aircraft seat fixation device according to claim 6, wherein the positioning unit holds the connection member in the normal position by a preload force in a force-fit manner.

8. The aircraft seat fixation device according to claim 1, wherein the at least one compensation unit is arranged at least partially between the fitting element and the seat foot.

9. The aircraft seat fixation device according to claim 1, wherein the at least one compensation unit is at least configured, in an overload case, to permit an increase of a distance between a front fitting element and the seat base structure.

10. The aircraft seat fixation device according to claim 1, wherein the at least one compensation unit comprises at least one fixation sleeve, which is arranged in the at least one seat foot such that it is axially displaceable, and which at least the one fitting element is fixedly connected to.

11. The aircraft seat fixation device according to claim 10, wherein, at least in a normal operation state, the fixation sleeve is held in the seat foot in a normal position by a friction-fit connection being arranged centrally in the through hole.

12. The aircraft seat fixation device according to claim 1, wherein the compensation unit comprises at least one additional lower longitudinal beam, on which the base frame is connected in a pivotable manner.

13. An aircraft seat with an aircraft seat fixation device according to claim 1.

14. An aircraft seat fixation device for a fixation at least of a portion of an aircraft seat on at least one fixation rail that is fixated on an aircraft structure, comprising:
- a seat base structure which is configured as a base frame such that at least the aircraft seat is mounted thereon at least partially,
- at least one seat foot which is connected to the seat base structure,
- at least one fitting element which is connected to the seat foot and is at least configured to be coupled with the fixation rail,
- at least one compensation unit, which is arranged on the seat base structure, the seat foot and/or the fitting element and which is configured to permit at least one compensation movement of the seat base structure at least in an overload case, wherein the compensation unit comprises at least one central swivel pin, by which the seat foot is coupled with the seat base structure in a positionally fixed manner, wherein the swivel pin forms a rotation axle, around which the seat foot is pivotable relative to the base frame.

15. The aircraft seat fixation device according to claim 14, wherein the at least one compensation unit is arranged between the seat base structure and the seat foot.

16. The aircraft seat fixation device according to claim 14, wherein the compensation unit is integrated in a seat foot connection, via which the at least one seat foot is connected to the seat base structure.

17. The aircraft seat fixation device according to claim 14, wherein a compensation movement executed by the compensation unit is at least substantially free of elastic and/or plastic deformation.

18. An aircraft seat with an aircraft seat fixation device according to claim 14.

* * * * *